US012779672B2

(12) United States Patent
Bourret et al.

(10) Patent No.: US 12,779,672 B2
(45) Date of Patent: Nov. 3, 2026

(54) GRASP PLANNING OF UNKNOWN OBJECT FOR DIGITAL HUMAN MODEL

(71) Applicant: Dassault Systemes Americas Corp., Waltham, MA (US)

(72) Inventors: Quentin Bourret, Montreal (CA); Pierre-Olivier Lemieux, Montreal (CA); Julie Charland, Montreal (CA); Rachid Aissaoui, Montreal (CA)

(73) Assignee: Dassault Systemes Americas Corp., Waltham, MA (US)

( * ) Notice: Subject to any disclaimer, the term of this patent is extended or adjusted under 35 U.S.C. 154(b) by 925 days.

(21) Appl. No.: 18/173,172

(22) Filed: Feb. 23, 2023

(65) Prior Publication Data

US 2023/0264349 A1 Aug. 24, 2023

Related U.S. Application Data

(60) Provisional application No. 63/312,954, filed on Feb. 23, 2022.

(51) Int. Cl.
*B25J 9/16* (2006.01)

(52) U.S. Cl.
CPC ........... *B25J 9/1612* (2013.01); *B25J 9/1607* (2013.01); *B25J 9/1671* (2013.01)

(58) Field of Classification Search
CPC ...... B25J 9/1607; B25J 9/1612; B25J 9/1671; G06F 3/011; G06F 3/04815;
(Continued)

(56) References Cited

U.S. PATENT DOCUMENTS 7,457,678 B2 11/2008 Smith et al.
8,260,593 B2 9/2012 Raschke
(Continued)

FOREIGN PATENT DOCUMENTS

EP 3136346 A1 3/2017

OTHER PUBLICATIONS

Fan, Yongxiang, and Masayoshi Tomizuka. "Efficient grasp planning and execution with multifingered hands by surface fitting." IEEE Robotics and Automation Letters 4.4 (2019): 3995-4002. (Year: 2019).*
(Continued)

*Primary Examiner* — Nithya J. Moll
(74) *Attorney, Agent, or Firm* — Hamilton, Brook, Smith & Reynolds, P.C.

(57) ABSTRACT

An embodiment receives models of an object and an environment and an indication of position of a digital human model (DHM). An oriented bounding box (with a plurality of faces) surrounding the model of the object is determined and, for each of the plurality of faces, a candidate grasp location, a candidate grasp orientation, and a candidate grasp type is determined. From amongst the plurality of faces, one or more graspable faces is determined based on: the candidate grasp locations, the candidate grasp orientations, the environment model, and dimensions of each face. Then, an optimal graspable face is identified based on a hierarchy and the position of the DHM. An inverse kinematic solver determines position and orientation, i.e., grasp, of an end effector of the DHM grasping the object based on the candidate grasp location, candidate grasp orientation, and candidate grasp type of the optimal graspable face.

20 Claims, 17 Drawing Sheets

(58) Field of Classification Search
CPC ..... G06F 3/04845; G06F 30/12; G06T 19/20; G06T 2210/12; G06T 2219/2004; G06T 2219/2016
See application file for complete search history.

(56) References Cited

U.S. PATENT DOCUMENTS

| | | | | |
|---|---|---|---|---|
| 9,129,077 | B2 | 9/2015 | Raschke | |
| 9,576,503 | B2 | 2/2017 | Stephanian | |
| 10,576,625 | B1 | 3/2020 | Stubbs et al. | |
| 10,607,413 | B1 | 3/2020 | Marcolina et al. | |
| 11,548,145 | B2 | 1/2023 | Levine et al. | |
| 11,574,270 | B1 | 2/2023 | Chee | |
| 11,620,416 | B2 | 4/2023 | Lemieux et al. | |
| 11,654,564 | B2 | 5/2023 | Fan | |
| 11,685,058 | B2 | 6/2023 | Yerazunis et al. | |
| 11,775,699 | B2 | 10/2023 | Macloud et al. | |
| 11,931,898 | B2 | 3/2024 | Berard et al. | |
| 12,017,356 | B2 | 6/2024 | Fan et al. | |
| 12,321,672 | B2 | 6/2025 | Zeighami et al. | |
| 12,554,902 | B2 | 2/2026 | Brouillette et al. | |
| 2005/0062738 | A1 | 3/2005 | Handley et al. | |
| 2007/0013651 | A1 | 1/2007 | Depue et al. | |
| 2008/0109271 | A1 | 5/2008 | Smith et al. | |
| 2009/0173560 | A1 | 7/2009 | Nakamoto et al. | |
| 2010/0256790 | A1 | 10/2010 | Teran-Matus et al. | |
| 2012/0004774 | A1 | 1/2012 | Umetsu | |
| 2013/0069936 | A1 | 3/2013 | Tsai et al. | |
| 2014/0074546 | A1 | 3/2014 | Poletti et al. | |
| 2014/0163731 | A1 | 6/2014 | Shi et al. | |
| 2014/0354528 | A1 | 12/2014 | Laughlin et al. | |
| 2014/0371871 | A1 | 12/2014 | Farina et al. | |
| 2016/0148132 | A1 | 5/2016 | Aqlan et al. | |
| 2017/0061043 | A1 | 3/2017 | Lemieux et al. | |
| 2017/0169138 | A1 | 6/2017 | Lemieux et al. | |
| 2017/0235853 | A1 | 8/2017 | Griswold et al. | |
| 2017/0344919 | A1 | 11/2017 | Chang et al. | |
| 2018/0000416 | A1 | 1/2018 | Hegde | |
| 2019/0248003 | A1 | 8/2019 | Nagarajan et al. | |
| 2019/0321974 | A1 | 10/2019 | Leon et al. | |
| 2019/0366539 | A1 | 12/2019 | Arisoy et al. | |
| 2020/0159716 | A1 | 5/2020 | Bates | |
| 2020/0316782 | A1 | 10/2020 | Chavez et al. | |
| 2020/0349299 | A1* | 11/2020 | Macloud | G06F 30/12 |
| 2020/0349300 | A1 | 11/2020 | Lemieux et al. | |
| 2020/0391385 | A1 | 12/2020 | Oka et al. | |
| 2021/0031375 | A1 | 2/2021 | Drumwright et al. | |
| 2021/0178591 | A1 | 6/2021 | Floyd-Jones et al. | |
| 2021/0186792 | A1 | 6/2021 | Ewaldsson et al. | |
| 2021/0232810 | A1 | 7/2021 | Parsa et al. | |
| 2021/0241919 | A1 | 8/2021 | Bradbury et al. | |
| 2022/0092230 | A1 | 3/2022 | Callan et al. | |
| 2022/0122009 | A1 | 4/2022 | Petterson et al. | |
| 2022/0338928 | A1 | 10/2022 | Hammer et al. | |
| 2022/0348409 | A1 | 11/2022 | Sun et al. | |
| 2023/0021942 | A1 | 1/2023 | Zeighami et al. | |
| 2023/0169225 | A1 | 6/2023 | Brouillette et al. | |
| 2023/0177228 | A1 | 6/2023 | Bourret et al. | |
| 2023/0177437 | A1 | 6/2023 | Bourret et al. | |
| 2024/0161039 | A1 | 5/2024 | Baek et al. | |
| 2024/0202463 | A1 | 6/2024 | Mazareinezhad et al. | |
| 2024/0428163 | A1 | 12/2024 | Penfield et al. | |
| 2026/0081032 | A1 | 3/2026 | Ghorbani et al. | |

OTHER PUBLICATIONS

Tian, Hao, et al. "Realtime hand-object interaction using learned grasp space for virtual environments." IEEE Transactions on Visualization and Computer Graphics 25.8 (2018): 2623-2635. (Year: 2018).*

Genaidy, A. M., A. A. Al-Shedi, and R. L. Shell. "Ergonomic risk assessment: preliminary guidelines for analysis of repetition, force and posture." Journal of human ergology 22.1 (1993). (Year: 1993).

HSE (Health and Safety Executive). "Manual handling assessment charts (the MAC tool)." (2014). (Year: 2014).

Humadi, Ahmed, et al. "Instrumented ergonomic risk assessment using wearable inertial measurement units: Impact of joint angle convention." IEEE Access 9 (2020). (Year: 2020).

Kim Taehyun. "An Early-Stage Development of Posture Model: To Prevent Work-Related Musculoskeletal Disorders on Construction Sites". Diss. Seoul National University Graduate School, 2014 (Year: 2014).

Wang, Jingwen, SangHyeok Han, and Xinming Li. "3D fuzzy ergonomic analysis for rapid workplace design and modification in construction." Automation in construction 123 (2021): (Year: 2021).

Weston, Eric B., et al. "One versus two-handed lifting and lowering: lumbar spine loads and recommended one-handed limits protecting the lower back." Ergonomics 63.4 (2020): (Year: 2020).

Kellenberger, Kathi, and Scott Shaw. Beginning T-SQL. 3rd ed. 2014. Berkeley, CA: Apress, 2014. Web. (Year: 2014).

Reed, Matthew P. et al. "The HUMOSIM Ergonomics Framework: A New Approach to Digital Human Simulation for Ergonomic Analysis." SAE Technical Papers (2006) (Year: 2006).

Tecnomatix, "Classic Jack: A premier human simulation tool for populating your design with virtual people and performing human factors and ergonomic analyses." Siemens, 2016 (Year: 2016).

Bohlin et al. ("Automatic Creation of Virtual Manikin Motions Maximizing Comfort in Manual Assembly Processes", Elsevier pub., 2012, pp. 1-5) (Year: 2021).

"Ergonomic Workplace Design", Dassault systems, 2002, 6 pages.

Agote-Garrido, A., et al., "Manufacturing System Design in Industry 5.0: Incorporating Sociotechnical Systems and Social Metabolism for Human-Centered, Sustainable, and Resilient Production.", Systems, vol. 11, Issue. 537, 2023, pp. 1-19.

Ahmed, S., et al., "Integrating human factors early in the design process using digital human modelling and surrogate modelling.", Journal of Engineering Design, vol. 32, Issue. 4, 2021, pp. 165-186.

Bahçivancilar U., "Validation of methods time measurement data," MS thesis. Middle East Technical University, 2012, 64 pages.

Baraldi. A.N., et al., "An introduction to modern missing data analyses," Journal of School Psychology, vol. 48, 2010, pp. 5-37.

Barnes. R.M., "Motion and time study: design and measurement of work," John Wiley & Sons, Seventh edition, 1991, 20 pages.

Beuss, F., et al., "Automated simulation-based design of ergonomic workstations using RPA and Human-in-the-Loop decision making. ", Procedia CIRP, vol. 119, 2023, pp. 216-221.

Bland. J.M., et al., "Measuring agreement in method comparison studies," Statistical Methods in Medical Research, vol. 8, 1999, pp. 135-160.

Bland. J.M., et al., "Multiple significance tests: the Bonferroni method," BMJ, vol. 310, 1995, p. 170.

Bland. J.M., et al., "Statistical Methods for Assessing Agreement Between Two Methods of Clinical Measurement," Thelancet, vol. 8, 1985, 9 pages.

Borg, G., "Psychophysical scaling with applications in physical work and the perception of exertion.", Scandinavian journal of work, environment & health, vol. 16, Issue. 1, 1990, pp. 55-58.

Bures, M., et al., "Comparison of Time Standardization Methods on the Basis of Real Experiment", Procedia Engineering, vol. 100, 2015, pp. 466-474.

Bures. M., et al., "Comparison of the Predetermined Time Systems MTM-1 and BasicMOST in Assembly Production," IEEE, 2013, pp. 546-550.

Chaffin, D. B., "Improving digital human modelling for proactive ergonomics in design.", Ergonomics, vol. 48, Issue. 5, 2005, pp. 478-491.

Chaffin. D.B., "Occupational biomechanics-a basis for workplace design to prevent musculoskeletal injuries," Ergonomics, vol. 30, Issue 2, 1987, pp. 321-329.

Clark. L.D., et al., "Extending Fitts' law in three-dimensional virtual environments with current low-cost virtual reality technology," International Journal of Human-Computer Studies, vol. 139, 2020, 17 Pages.

Colombini, D., et al., "The revised OCRA Checklist method.", Editorial Factors Humans: Barcelona-Spain, 2013, pp. 1-60.

(56) References Cited

OTHER PUBLICATIONS

Crossman. E.R.F.W., et al., "Feedback control of hand-movement and Fitts' Law," Quarterly Journal of Experimental Psychology, vol. 35A, 1983, pp. 251-278.
Da Silva, A. G., et al., "Virtual reality and digital human modeling for ergonomic assessment in industrial product development: a patent and literature review.", Applied Sciences, vol. 12, Issue. 3, 2022, pp. 1-24.
Dahibhate, G., et al., "The use of digital human modeling in ergonomic design and product development.", Journal of the Institution of Engineers, vol. 104, Issue. 5, 2023, pp. 1133-1138.
De Magistris, G., et al., "Dynamic control of DHM for ergonomic assessments.", International Journal of Industrial Ergonomics, vol. 43, Issue. 2, 2013, pp. 170-180.
Emir, T., et al., "Computer-Assisted Ergonomic Analysis of Working Postures Causing Strain.", European Journal of Forest Engineering, vol. 8, Issue. 2, 2022, pp. 66-76.
Faber. G.S. et al., "Working height, block mass and one- vs. twohanded block handling: the contribution to low back and shoulder loading during masonry work," Ergonomics, vol. 52, No. 9, Sep. 2009, pp. 1104-1118.
Fitts. P.M. et al., "The Information Capacity of the Human Motor System in Controlling the Amplitude of Movement," Journal of Experimental Psychology, vol. 47, No. 6, Jun. 1954, pp. 381-391.
Frost. J., "How to Interpret R-squared in Regression Analysis," 2021, 8 pages.
Genaidy. A.M., et al., "The Validity of Predetermined Motion Time Systems in Setting Production Standards for Industrial Tasks," International Journal of Industrial Ergonomics, vol. 3, 1989, pp. 249-263.
Ghorbani, E., et al., "Ergonomic Assembly Line Balancing Problems Evolution and Future Trends with Insights into Industry 5.0 Paradigm.", Université de Montreal, Jul. 16, 2023, 34 pages.
Ghorbani, E., et al., "Fuzzy Ergonomic Expert System for Assembly Line Design Problem.", Accessibility, Assistive Technology and Digital Environments, vol. 121, 2024, pp. 250-260.
Ghorbani, E., et al., "Fuzzy expert system for ergonomic assembly line worker assignment and balancing problem under uncertainty", Journal of Industrial and Production Engineering, Aug. 16, 2024, 24 pages.
Ghorbani, E., et al., "Fuzzy fatigue model for ergonomic design of assembly lines under uncertainty.", Intelligent Systems Conference, 2024, pp. 392-407.
Ghorbani, E., et al., "Optimization Framework for Assembly Line Design Problem with Ergonomics Consideration in Fuzzy Environment", IFIP Advances in Information and Communication Technology, vol. 702, Jun. 28, 2024, 11 pages.
Hamilton, B. CS, et al., "Artificial intelligence based real-time video ergonomic assessment and training improves resident ergonomics.", The American Journal of Surgery, vol. 226, Issue. 5, 2023, pp. 741-746.
Harari, Y. et al., "Factors determining workers' pace while conducting continuous sequential lifting, carrying, and lowering tasks," Applied ergonomics, vol. 67, 2018, pp. 61-70.
International Organization for Standardization. Safety of Machinery: Anthropometric Requirements for the Design of Workstations at Machinery, ISO, First edition, 2002, 37 pages.
JMP, "Statistical Software for Insight-Driven Improvement Seeing is understanding.", JMP software combines interactive visualization with powerful statistics., 2024, 4 pages.
Karger, D W. et al, "Engineered work measurement: the principles, techniques, and data of methods-time measurement background and foundations of work measurement and methods-time measurement, plus other related material," Industrial Press Inc., Chapter 3, 1987, pp. 37-51.
Karhu, O., et al., "Correcting working postures in industry: A practical method for analysis.", Applied ergonomics, vol. 8, Issue. 4, 1977, pp. 199-201.
Khamaisi, R. K., et al., "An innovative integrated solution to support digital postural assessment using the TACOs methodology. ", Computers & Industrial Engineering, vol. 194, 2024, pp. 1-14.
Kodak's ergonomic design for people at work, The Eastman Kodak Company, Second edition, 2003, 723 pages.
Kulac, S., et al., "An integrated ergonomic risk assessment framework based on fuzzy logic and IVSF-AHP for optimising ergonomic risks in a mixed-model assembly line.", Ergonomics, 2024, pp. 1-22.
Kurkin. O., et al., "Evaluation of operational times by MTM methods in the digital factory environment," Annals of DAAAM for 2011 & Proceedings of the 22nd International DAAAM Symposium, vol. 22, No. 1, 2011, pp. 0671-0672.
Lavatelli, I., et al., "Correlations in between EAWS and OCRA Index concerning the repetitive loads of the upper limbs in automobile manufacturing industries.", Work, vol. 41, 2012, pp. 4436-4444.
Li, X., et al., "An improved physical demand analysis framework based on ergonomic risk assessment tools for the manufacturing industry.", International journal of industrial ergonomics, vol. 70, 2019, pp. 58-69.
MacKenzie, I.S., "Movement Time Prediction in Human-Computer Interfaces," Readings in human-computer interaction, 1995, pp. 483-493.
MacKenzie. I.S., "Fitts' law as a research and design tool in human-computer interaction," Human-computer interaction, vol. 7, 1992, pp. 91-139.
MacKenzie. I.S., "Fitts' Law," The wiley handbook of human computer interaction, vol. 1, 2018, pp. 347-370.
MacKenzie. I.S., et al., "Extending Fitts' Law to Two-Dimensional Tasks," Proceedings of the SIGCHI conference on Human factors in computing systems, 1992, pp. 219-226.
Manghisi, V. M., et al., "A virtual reality approach for assisting sustainable human-centered ergonomic design: the ErgoVR tool.", Procedia Computer Science, vol. 200, 2022, pp. 1338-1346.
Massiris Fernandez, M., et al., "Ergonomic risk assessment based on computer vision and machine learning.", Computers & Industrial Engineering, vol. 149, 2020, 11 pages.
Mazareinezhad, F., et al., "Evaluating the Accuracy of the Most Predetermined Motion Time System Through Lab Experiments," Human Aspects of Advanced Manufacturing, Production Management and Process Control, vol. 146, 2024, pp. 116-122.
Gibson, James, J., "The Theory of Affordances," The Ecological Approach to Visual Perception (1979).
Goussous et al. "A New Methodology for Human Grasp Predication" IEEE Transactions on Systems, Man, and Cybernetics—Part A: Systems and Humans, vol. 39, No. 2, Mar. 2009 (Year: 2009).
Goussous, F. A., "Grasp Planning for digital humans," Thesis, University of Iowa, 87 pages (2007).
Hanson, Lars, et al., "IMMA—Intelligently Moving Manikins in Automotive Applications", Third International Summit on Human Simulation, ISHS, Tokyo, Japan, 2014.
Hignett et al., Practical Ergonomics, REBA Employee Assessment Worksheet, 1 page, based on Technical note: Rapid Entire Body Assessment (REBA), Hignett, McAtamne, Applied Egonomics, 31(2): 201-205 (2000).
Hignett, S., & McAtamney, L., "Rapid entire body assessment (REBA)", Applied Ergonomics, 31(2), 201-205 (2000).
Holleman, C. and L.E. Kavraki, "A framework for using the workspace medial axis in PRM planners," in: Proceedings 2000 ICRA. Millennium Conference. IEEE International Conference on Robotics and Automation. Symposia Proceedings (Cat. No. 00CH37065), IEEE, pp. 1408-1413 (2000).
Huang, J. and C.-H. Menq, "Automatic data segmentation for geometric feature extraction from unorganized 3-D coordinate points," IEEE Transactions on Robotics and Automation, vol. 17, No. 3, pp. 268-279 (2001).
Hueser, M., et al., "Learning of demonstrated grasping skills by stereoscopic tracking of human head configuration," in Robotics and Automation, ICRA 2006. Proceedings 2006 IEEE International Conference on, IEEE, 2795-2800 (2006).

(56) References Cited

OTHER PUBLICATIONS

Human Factors Engineering, "The next generation of human modeling and simulation begins when you're ready," Virtual Soldier Research, 8 pages (2004).
International Labour Office in collaboration with the International Ergonomics Association, Ergonomic Checkpoints: Practical and Easy-To-Implement Solutions for Improving Safety, Health, and Working Conditions, Second Edition, 2010, Geneva, Switzerland.
International Organization for Standardization, ISO 11226:2000, "Ergonomics—Evaluation of static working postures" Technical Corrigendum 1, 2000, Geneva, Switzerland.
International Organization for Standardization, ISO 11228-3:2007, "Ergonomics—Manual handling—part 3: Handling of low loads at high frequency", 2007, Geneva, Switzerland.
International Organization for Standardization, ISO 14738:2002, "Safety of machinery—Anthropometric requirements for the design of workstations at machinery", p. 12, Sep. 2002, Geneva, Switzerland.
Johns et al. "Deep Learning a Grasp Function for Grasping under Gripper Pose Uncertainty" 2016 IEEE/RSJ International Conference on Intelligent Robots and Systems (IROS) (Year: 2016).
Jung, E.S. and J. Choe, "Human reach posture prediction based on psychophysical discomfort," International Journal of Industrial Ergonomics, 1996. 18(2-3): p. 173-179.
Jung, E.S., et al., "Upper body reach posture prediction for ergonomic evaluation models". International Journal of Industrial Ergonomics, 1995. 16(2): p. 95-107. (Science Direct).
Kyota, F., et al., "Detection and evaluation of grasping positions for autonomous agents," In International Conference on Cyberworlds, 9 pages (2005).
LaValle, S.M., et al. "Randomized Kinodynamic Planning", The International Journal of Robotics Research, vol. 20, No. 5, May 5, 2001, pp. 378-400.
Lehericey, F., "Iterative and Predictive Ray-Traced Collision Detection for Multi-GPU Architectures," Graphics [cs.GR]. 2013.
Lemieux, P.-O., et al., "Degrees of freedom coupling adapted to the upper limb of a digital human model," International Journal of Human Factors Modelling and Simulation, 5(4): 314-337 (2017).
Lemieux, Pierre-Olivier, et al., "A visual acuity constraint for digital human modeling", Conference proceedings 4th. 2016.
Leon et al. "From Robot to Human Grasping Simulation" 2014, Springer, Cognitive Systems Monographs vol. 19 (Year: 2014).
Li, X., et al., "Point cloud surface segmentation based on volumetric eigenfunctions of the Laplace-Beltrami operator," Computer Aided Geometric Design, 71: 157-175 (2019).
Li, Y. and N. Pollard, "A Shape Matching Algorithm for Synthesizing Humanlike Enveloping Grasps," in IEEE/RAS Int. Conf on Humanoid Robots (Humanoids), pp. 442-449 (2005).
Li, Y., et al. "On motion planning for narrow-clearance assemblies using virtual manikins" Science Direct, 51st CIRP Conference on Manufacturing Systems, Procedia CIRP 72 (2018) 790-795.
Liu, Y. and N.I. Badler, "Real-time reach planning for animated characters using hardware acceleration.", in Proceedings 11th IEEE international workshop on program comprehension. 2003. IEEE.
Ma, C.-M., et al., "Three-dimensional topology preserving reduction on the 4-subfields," IEEE Transactions on Pattern Analysis and Machine Intelligence, 24: 1594-1605 (2002).
Macloud, A., et al. "Extracting grasping cues from pistol-shaped tools for digital human models." Computer-Aided Design and Applications 18.6 (2021): 1167-1185.
Macloud, A., et al., "Extracting Grasping Cues From One-Handed Tools Geometry for Digital Human Models," (2019).
McAtamney, L., et al., "RULA: a survey method for the investigation of work-related upper limb disorders", Applied Ergonomics, pp. 91-99, vol. 24, No. 2, Apr. 1993.
Miller, A.T., et al., "Automatic grasp planning using shape primitives," in Robotics and Automation, Proceedings. ICRA'03. IEEE International Conference on, IEEE, 1824-1829 (2003).
Minetto, R., et al., "An optimal algorithm for 3D triangle mesh slicing," Computer-Aided Design, 92: 1-10 (2017).
Mital, A.: Guide to Manual Materials Handling. CRC Press, Boca Raton (1997).
Myers, A., et al., "Affordance Detection of Tool Parts from Geometric Features," In International Conference on Robotics and Automation, pp. 1374-1381 (2015).
Myers, A., et al., "Affordance of Object Parts from Geometric Features," In International Conference on Robotics and Automation, pp. 1374-1381 (2015).
Namgung, I., "Path space approach for planning 2d shortest path based on elliptic workspace geometry mapping", KSME international Journal, 2004. 18(1): p. 92-105.
Nguyen, V.-D., "Constructing force-closure grasps," Int. Jour. Robotic Res, 7(3): 3-16 (1988).
Nguyen, V.-D., "Constructing stable grasps in 3D," in Robotics and Automation Proceedings. 1987 IEEE International Conference on, IEEE, 234-239 (1987).
Park, W., et al., "Toward memory-based human motion simulation: development and validation of a motion modification algorithm", IEEE transactions on systems, man, and cybernetics—Part A: Systems and Humans, 2004. 34(3): p. 376-386.
Parkinson, M.B. and Reed, M.P., "Creating virtual user populations by analysis of anthropometric data," International Journal of Industrial Ergonomics, 40(1): 106-111 (2010).
Peinado, M., et al., "Full-body avatar control with environment awareness". IEEE Computer Graphics and Applications, 2009. 29(3): p. 62-75.
Perez, J., et al., "Ergonomists' and Engineers' Views on the Utility of Virtual Human Factors Tools", Human Factors and Ergonomics in Manufacturing & Services Industries, 25 (3) 279-293 (2015).
Perez, M.A., "Prediction of whole-body lifting kinematics using artificial neural networks", 2005, Virginia Tech.
Pettré, J., et al., "A 2-Stages Locomotion Planner for Digital Actors", Eurographics, SIGGRAPH Symposium on Computer Animation (2003).
Pettré, J., et al., "Planning human walk in virtual environments", in IEEE/RSJ International Conference on Intelligent Robots and Systems. 2002. IEEE.
Pitarch, E.P., et al., "SANTOS™ hand: a 25 degree-of-freedom model," SAE Technical Paper (2005).
Prabhakar, S. and M.R. Henderson, "Automatic form-feature recognition using neural-network-based techniques on boundary representations of solid models," Computer-Aided Design, 24: 381-393 (1992).
Reed, M.P, et al., "The HUMOSIM Ergonomics Framework: A New Approach to Digital Human Simulation for Ergonomic Analysis", SAE Technical Papers, Jul. 2006.
Reed, M.P. and D.W. Wagner, "An integrated model of gait and transition stepping for simulation of industrial workcell tasks", SAE Transactions, 2007: p. 2062-2072.
Bernard, B. P., et al., "Musculoskeletal Disorders and Workplace Factors", A Critical Review of Epidemiologic Evidence for Work-Related Musculoskeletal Disorders of the Neck, Upper Extremity, and Low Back, Jul. 1997, 590 pages.
Bevan, S., et al., "Economic impact of musculoskeletal disorders (MSDs) on work in Europe", Best Practice & Research Clinical Rheumatology, vol. 29 No. 3, Jun. 2015, pp. 356-373.
Colombini, D.. et al., "Risk Assessment and Management of Repetitive Movements and Exertions of Upper Limbs—Job Analysis, Ocra Risk Indices, Prevention Strategies and Design Principles," in Elsevier Ergonomics Book Series, vol. 2, eds., pp. 192 (2002).
De Magistris, G., et al., "Dynamic digital human models for ergonomic analysis based on humanoid robotics techniques", International Journal of the Digital Human, vol. 1, No. 1, Jan. 28, 2015, 30 pages.
Falck, A. C., et al., "The impact of poor assembly ergonomics on product quality: A cost-benefit analysis in car manufacturing", Human Factors and Ergonomics in Manufacturing & Service Industries, vol. 20, No. 1, 2010, pp. 24-41.
Hales, T. R., et al., "Epidemiology of Work-Related Musculoskeletal Disorders", Orthopedic Clinics of North America, vol. 27, No. 4, Oct. 1996, pp. 679-709.

(56) References Cited

OTHER PUBLICATIONS

Kazmierczak, K., et al., "A case study of serial-flow car disassembly: Ergonomics, productivity and potential system performance", Human Factors and Ergonomics in Manufacturing, vol. 17, No. 4, 2007, pp. 331-351.
Laring, J., et al., "ErgoSAM: A Preproduction Risk Identification Tool", Human Factors and Ergonomics in Manufacturing, vol. 15, No. 3, 2005, pp. 309-325.
Leigh, J. P., et al., "Economic Burden of Occupational Injury and Illness in the United States", The Milbank Quarterly, vol. 89. No. 4, 2011, pp. 728-772.
Ma, L., et al., "A Framework for Interactive Work Design based on Motion Tracking, Simulation, and Analysis", Human Factors and Ergonomics in Manufacturing, vol. 44, No. 4, Apr. 2010, pp. 339-352.
Neumann, W. P., et al., "Human Factors: Spanning the Gap between OM & HRM", Forthcoming in International Journal of Operations & Production Management, Jun. 4, 2010, 57 pages.
Schaub, K. G., et al., "Ergonomic assessment of automotive assembly tasks with digital human modelling and the 'ergonomics assessment worksheet' (EAWS)", International Journal of Human Factors Modelling and Simulation, vol. 3, No. 3-4, 2012, 29 pages.
Silverstein, B., et al., "Use of a prevention index to identify industries at high risk for work-related musculoskeletal disorders of the neck, back, and upper extremity in Washington state, 1990-1998", American Journal of Industrial Medicine, vol. 41, No. 149, 2002, pp. 149-169.
Wells, R., et al., "Time—A key issue for musculoskeletal health and manufacturing", Applied Ergonomics, vol. 38, No. 6, Nov. 2007, pp. 733-744.
Zandin, K. B., "Most (Registered) Work Measurement Systems", Third Edition, Revised and Expanded, 2003, 548 pages.
Abdel-Malek, K., et al., "Santos: An integrated human modeling and simulation platform, in DHM and Posturography". 2019, Elsevier. p. 63-77.
Abdel-Malek, K., et al., "Towards a new generation of virtual humans. International Journal of Human Factors Modelling and Simulation", 2006. 1(1): p. 2-39.
Afyouni, I, et al. "Spatial models for context-aware indoor navigation systems: A survey", Journal of Spatial Information Science, 2012, 1 (4), pp. 85-123.
Al-Masri et al. "Human-Like Motion Based on a Geometrical Inverse Kiematics and Energetic Optimization" 2008 IEEE/RSJ International Conference on Intelligent Robots and Systems (Year: 2008).
Au, O.K.-C., et al., "Skeleton extraction by mesh contraction," in: ACM transactions on graphics, vol. 27, No. 3, article 44, (2008).
Badler, Norman I., et al., "Animation control for real-time virtual humans." Communications of the ACM 42.8 (1999): 64-73.
Baerlocher, P. and R. Boulic, An inverse kinematic architecture enforcing an arbitrary number of strict priority levels. The visual computer, 2004. 20(6): p. 402-417.
Baerlocher, P., "Inverse kinematics techniques of the interactive posture control of articulated figures," [Ph. D. thesis]. Ecole Polytechnique Federale de Lausanne (EPFL) (2001).
Bataineh, M., et al. "Neural network for dynamic human motion prediction", Science Direct, Expert Systems with Applications, 48 (2015) 26-34.
Bekey, George A., et al. "Knowledge-based control of grasping in robot hands using heuristics from human motor skills." IEEE Transactions on Robotics and Automation 9.6 (1993): 709-722.
Berscheid, L., et al., "Improving Data Efficiency of Self-supervised Learning for Robotic Grasping," arXiv preprint arXiv:1903.00228, (2019).
Bhatia, N., et al., "Modeling visually guided hand reach for Digital Human Models", Science Direct, 6th Internatioanl Conference on Applied Human Factors and Ergonomics (WHFE 2015) and the Affiliated Conferences, AHFE 2015, Procedia Manufacturing 3 (2015) 3820-3827.
Björkenstam, S., et al., "Enhancing digital human motion planning of assembly tasks through dynamics and optimal control", Science Direct, Procedia CIRP, 2016. 44: p. 20-25.
Blanchonette, P., "Jack Human Modelling Tool: A Review", Australian Government Deparment of Defense, Defense Science and Technology Organisation Technical Report, DSTO-TR-2364, AR-014-672, Jan. 2010, Victoria, Australia.
Bohg, J. and D. Kragic, "Learning grasping points with shape context," Robotics and Autonomous Systems, vol. 58, No. 4, pp. 362-377 (2009).
Bohg, J., et al., "Data-driven grasp synthesis—a survey," IEEE Transactions on Robotics, 30(2), 289-309 (2014).
Bourret, Q., et al. "Flexible hand posture for tools grasping." DHM (2019).
Bourret, Q., et al., "Ergo4All: An Ergonomic Guidance Tool for Non-ergonomist", In: Black N.L., Neumann W.P., Noy I. (eds) Proceedings of the 21st Congress of the International Ergonomics Association (IEA 2021). IEA 2021.
Bourret, Q., et al., "Grasp Planning of Unknown Object for Digital Human Model", 13th International Conference on Applied Human Factors and Ergonomics.
Burns, E., et al., "The hand is more easily fooled than the eye: Users are more sensitive to visual interpenetration than to visual-proprioceptive discrepancy". Presence: teleoperators & virtual environments, 2006. 15(1): p. 1-15.
Buss, S.R. and Kim, J.-S., "Selectively damped least squares for inverse kinematics," Journal of Graphics tools, 10(3). 37-49 (2004).
Chaffin et al., "Simulating Reach Motions", Society of Automotive Engineers, Inc. 1999.
Chaffin, D.B., "Digital Human Modeling for Workspace Design", Reviews of Human Factors and Ergonomics, Dec. 2008.
Chaffin, D.B., "Human motion simulation for vehicle and workplace design", Human Factors and Ergonomics in Manufacturing & Service Industries, 2007. 17(5): p. 475-484.
Cheze, L., et al., "Determination of the number of degrees of freedom of the trapeziometacarpal joint—an in vitro study," IRBM, 33(4):271-277 (2012).
Cornea, N.D., et al., "Curve-skeleton properties, applications, and algorithms," IEEE Transactions on Visualization & Computer Graphics, 20 pages (2007).
Cort, J.A. and Devries, D., "Accuracy of Postures Predicted Using a Digital Human Model During Four Manual Exertion Tasks, and Implications for Ergonomic Assessments", IISE Transactions on Occupational Ergonomics and Human Factors, 7:43-58 (2019).
Cutkosky, M.R. and R.D. Howe, "Human Grasp Choice and Robotic Grasp Analysis," In Dextrous Robot Hands, Springer-Verlag, pp. 5-31 (1990).
Cutkosky, M.R., "On grasp choice, grasp models, and the design of hands for manufacturing tasks," IEEE Transactions on robotics and automation, 5(3): 269-279 (1989).
Diaz, C., et al., "Grasping points for handle objects in a cooperative disassembly system," IFAC Proceedings vols. 40: 126-131 (2007).
Diffrient et al., "Humanscale 7/8/9," 1982, The MIT Press.
Duffy, V.G., "Handbook of Digital Human Modeling: Research for Applied Ergonomics and Human Factors Engineering (1st ed.)". Chapter 2.4 (2008).
Ekvall, S. and Kragic, D., "Interactive grasp learning based on human demonstration," in Robotics and Automation, Proceedings. ICRA'04. 2004 IEEE International Conference on, IEEE, 3519-3524 (2004).
El-Khoury, S. and A. Sahbani, "A new strategy combining empirical and analytical approaches for grasping unknown 3D objects," Robotics and Autonomous Systems, 34 pages (2009).
El-Khoury, S., "Approche Mixte, Analytique et par Apprentissage, pour la Synthèse d'une Prise Naturelle" (Thesis, Pierre et Marie Curie University, Paris, France, 2008).
Endo, Y., et al., "A computer-aided ergonomic assessment and product design system using digital hands," in International Conference on Digital Human Modeling, Springer, 833-842 (2007).
Endo, Y., et al., "An application of a digital hand to ergonomic assessment of handheld information appliances," SAE Technical Paper (2006).

(56) References Cited

OTHER PUBLICATIONS

Endo, Y., et al., “Optimization-based grasp posture generation method of digital hand for virtual ergonomics assessment,” SAE international journal of passenger cars-electronic and electrical systems, 1 (2008-01-1902). 590-598 (2009).
Endo, Y., et al., “Virtual grasping assessment using 3D digital hand model,” in Annual Applied Ergonomics Conference: Celebrating the Past-Shaping the Future (2007).
Ergonomics Specialist—Dassault Systèmes, “Human-Centered Prodcut and Workplace Design with Virtual Ergonomics”, https://www.3ds.com/products-services/delmia/disciplines/industrial-engineering/tag/88-1007/. Downloaded from Internet Jan. 11, 2023.
European Committee for Standardization, EN 1005-2. Safety of machinery—Human physical performance. Part 2: Manual handling of machinery and component parts of machinery. Brussels, European Committee for Standardization (2003).
European Committee for Standardization, EN 1005-3:2002+A1:2008, “Safety of machinery—Human physical performance—Part 3: Recommended force limits for machinery operation”, Oct. 2008.
European Committee for Standardization, EN 1005-4:2002+A1:2008, “Safety of machinery—Human physical performance—Part 4: Evaluation of working postures and movements in relation to machinery”, Oct. 2008.
Faraway, J.J., “Regression analysis for a functional response. Technometrics,” 1997. 39(3): p. 254-261.
Feix, T., et al. “The grasp taxonomy of human grasp types.” IEEE Transactions on human-machine systems 46.1 (2015): 66-77.
Feix, T., et al., “Analysis of human grasping behavior: Object characteristics and grasp type.” IEEE transactions on haptics 7.3 (2014): 311-323.
Feyen, R., et al., “Computer-aided ergonomics: a case study of incorporating ergonomics analyses into workplace design”. Applied ergonomics, 2000. 31(3): p. 291-300.
Fischer, M., et al., “Learning techniques in a dataglove based telemanipulation system for the DLR hand,” in Robotics and Automation, Proceedings. 1998 IEEE International Conference on, (1998), IEEE, 1603-1608 (1998).
Frazzoli, E., et al. “Algorithmic Foundations for Robotics X”, Proceedings of the Tenth Workshop on the Algorithmic Foundations of Robotics, 2013.
Gallagher, S. and M.C. Schall Jr, “Musculoskeletal disorders as a fatigue failure process: evidence, implications and research needs,” Ergonomics, 60(2): 255-269 (2016).
Reed, Matthew P., Miriam A. Manary, Carol AC Flannagan, and Lawrence W. Schneider. “Comparison of methods for predicting automobile driver posture.” SAE transactions (2000): 2279-2290. (Year: 2000).
Reed, M.P., et al., “Developing and implementing parametric human body shape models in ergonomics software,” in Proceedings of the 3rd International Digital Human Modeling Conference. Tokyo, Japan (2014).
Reed, M.P., et al., “Methods for measuring and representing automobile occupant posture,” SAE Technical Paper (1999).
Roa, et al., “Grasp quality measures: review and performance,” Autonomous robots, 38(1): 65-88 (2014).
Rouhi, R., et al., “A review on feature extraction techniques in face recognition,” Signal & Image Processing, vol. 3, No. 6 (2012).
Russell, S., et al., “Artificial Intelligence a Modern Approach” 3rd Edition Pearson Education, Inc. 2010.
Ryan, P.W., Cockpit Geometry Evaluation. vol. V. Validation. 1969, Boeing Co Seattle WA Military Aircraft Systems Div.
Sahbani, A., et al., “An overview of 3D object grasp synthesis algorithms,” Robotics and Autonomous Systems, 36 pages (2012).
Salvendy, G., Handbook of Human Factors and Ergonomics, Fourth Edition, 2012, John Wiley & Sons, Inc., Hoboken, New Jersey.
Santoshuman, Inc., “PredictiveHuman Model”, https://www.santoshumaninccom; (8 pages) downloaded from Internet Jan. 11, 2023.
Schmidt, P., et al., “Grasping of unknown objects using deep convolutional neural networks based on depth images,” in: 2018 IEEE International Conference on Robotics and Automation (ICRA), IEEE, pp. 6831-6838 (2018).
Siciliano, B., et al., “Robotics—Modeling, Planning and Control”, Advanced Texbooks in Control and Signal Processing (2009).
Stephens, A., and M. L. H. Jones. “Workplace methods and use of digital human models.” Handbook of Digital Human Modeling, USA: Taylor and Francis 6 (2009): 1-6.
Svensson, S., et al., “Curve skeletonization of surface-like objects in 3D images guided by voxel classification,” Pattern Recognition Letters, 23: 1419-1426 (2002).
Tay, S.C., et al., “In-vivo kinematic analysis of forearm rotation using helical axis analysis,” Clinical Biomechanics, 25(7): 655-659 (2010).
Vahrenkamp, N., et al., “Planning high-quality grasps using mean curvature object skeletons,” IEEE Robotics and Automation Letters, 3: 911-918 (2017).
Wagner, D.W., et al, “Predicting foot positions for manual materials handling tasks”, SAE transactions, 2005: p. 2872-2876.
Waters, Thomas R., et al., “Revised NIOSH equation for the design and evaluation of manual lifting tasks”, Ergonomics, pp. 749-776, vol. 26, No. 7, 1993.
Wu, G., et al., “ISB recommendation on definitions of joint coordinate system of various joints for the reporting of human joint motion—Part I: ankle, hip, and spine,” Journal of biomechanics, 35(4): 543-548 (2002).
Wu, G., et al., “ISB recommendation on definitions of joint coordinate systems of various joints for the reporting of human joint motion—Part II: shoulder, elbow, wrist and hand,” Journal of biomechanics, 38(5): 981-992 (2005).
Yamane, K., et al., “Synthesizing animations of human manipulation tasks,” ACM Transactions on Graphics, 23(3) (2004).
Yang, L., et al. “Survey of Robot 3D Path Planning Algorithms”, Journal of Control Science and Engineering, vol. 2016, Sril ID 7426913, 22 pages.
Zeighami, A., et al., “Stepping behavior for stability control of a digital human model”, AISB/ASB 2019.
Zhang, X., et al., “Optimization-based differential kinematic modeling exhibits a velocity-control strategy for dynamic posture determination in seated reaching movements”, Journal of Biomechanics 31 (1998) 1035-1042.
Zhang, Z., et al., “FeatureNet: Machining feature recognition based on 3D Convolution Neural Network,” Computer-Aided Design, 101: 12-22 (2018).
Zhao, L., et al., “Applying Empirical Data on Upper Torso Movement to Real-time Collision-free Reach Tasks”, SAE Technical Papers—Jun. 2005.
Zheng, Y., et al., “Ray-Shooting Algorithims for Robotics”, Disney Research Pittsburgh, 2012.
Zhou, W. and M.P. Reed, “Validation of the human motion simulation framework: posture prediction for standing object transfer tasks,” SAE Technical Paper (2009).
Zhou, Wei, et al. “Simulating complex automotive assembly tasks using the HUMOSIM framework”, No. 2009-01-2279. SAE Technical Paper, 2009.
Mital. A. et al., “Manual Materials Handling,” CRC Press, Second edition, 2017, 153 pages.
Nau R., “Notes on linear regression analysis,” Duke university, 2014, 18 pages.
Neumann. P., et al., “A case study evaluating the ergonomic and productivity impacts of partial automation strategies in the electronics industry,” International Journal of Production Research., vol. 40, No. 16, 2002, pp. 4059-4075.
Occhipinti, E., “OCRA: a concise index for the assessment of exposure to repetitive movements of the upper limbs.”, Ergonomics, vol. 41, Issue. 9, 1998, pp. 1290-1311.
Ozili. P.K., “The Acceptable R-square in Empirical Modelling for Social Science Research,” A guide to non-native english speakers. IGI global, 2023, pp. 134-143.
Paudel, P., et al., “Industrial ergonomics risk analysis based on 3d-human pose estimation.”, Electronics, vol. 11, Issue. 20, 2022, 20 pages.

(56) References Cited

OTHER PUBLICATIONS

Poirson, E., et al., "Comparative analysis of human modeling tools.", International Digital Human Modeling Symposium, Apr. 25, 2013, 8 pages.
Prisco, G., et al., "Capability of Machine Learning Algorithms to Classify Safe and Unsafe Postures during Weight Lifting Tasks Using Inertial Sensors.", Diagnostics, vol. 14, Issue. 6, 2024, pp. 1-15.
Sardar, S. K., et al., "Ergonomic risk assessment of manufacturing works in virtual reality context.", International Journal of Human-Computer Interaction, vol. 40, Issue. 14, 2024, pp. 3856-3872.
Tong, Y., et al., "Review of research and development of supernumerary robotic limbs.", IEEE/CAA Journal of Automatica Sinica, vol. 8, Issue. 5, 2021, pp. 929-952.
Turk. M. et al., "Ergonomic Evaluation of Basis Manual Assembly Operations With Integration of Simulation Tools," International Scientific Journal Industry 4.0, vol. 3, Issue 1, 2018, pp. 34-38.
Walker, G., et al., "Big data and ergonomics methods: A new paradigm for tackling strategic transport safety risks.", Heriot-Watt University, vol. 53, Issue. Part B, 2016, pp. 298-311.
Wang, J., et al., "3D fuzzy ergonomic analysis for rapid workplace design and modification in construction.", Automation in Construction, vol. 123, 2021, 14 pages.
Xie. Y et al., "Fitts' law on the flight deck: evaluating touchscreens for aircraft tasks in actual flight scenarios," Ergonomics, vol. 66, No. 4, 2023, pp. 506-523.
Yin, M.Y., et al., "A systematic review on digital human models in assembly process planning.", The International Journal of Advanced Manufacturing Technology, vol. 125, Issue. 3, 2023, pp. 1037-1059.
Giovanni, Diana, "Motion Capture Toolkit Development for Postural Assessment. Integration of Virtual Simulation tools for the Ergonomic Evaluation of Work tasks." PhD diss., Politecnico di Torino, 2021. (Year: 2021).
Hignett et al., Practical Ergonomics, REBA Employee Assessment Worksheet, 1 page, based on Technical note: Rapid Entire Body Assessment (REBA), Dec. 23, 2025, Applied Egonomics, 31(2).
Rosenbaum, David A., Ruud J. Meulenbroek, Jonathan Vaughan, and Chris Jansen. "Posture-based motion planning: applications to grasping." Psychological review 108, No. 4 (2001): 709. (Year: 2001).
Zheng, Weiguo, Hong Cheng, Lei Zou, Jeffrey Xu Yu, and Kangfei Zhao. "Natural language question/answering: Let users talk with the knowledge graph." In Proceedings of the 2017 ACM on Conference on Information and Knowledge Management, pp. 217-226. 2017. (Year: 2017).
Burdorf et al.; Exposure assessment strategies for work-related risk factors for musculoskeletal disorders; 1999; Scandinavian Journal of Work, Environment & Health; vol. 25 (Year: 1999).

* cited by examiner

990

991 992

| | Grasp Type | Image |
|---|---|---|
| 991a | Pinch |  |
| 991b | Medium Wrap |  |
| 991c | Precision Sphere |  |

GRASP PLANNING OF UNKNOWN OBJECT FOR DIGITAL HUMAN MODEL

RELATED APPLICATION

This application claims the benefit of U.S. Provisional Application No. 63/312,954, filed on Feb. 23, 2022. The entire teachings of the above application are incorporated herein by reference.

BACKGROUND

A number of existing product and simulation systems are offered on the market for the design and simulation of objects, e.g., humans, parts, and assemblies of parts, amongst other examples. Such systems typically employ computer aided design (CAD) and/or computer aided engineering (CAE) programs. These systems allow a user to construct, manipulate, and simulate complex three-dimensional models of objects or assemblies of objects. These CAD and CAE systems, thus, provide a representation of modeled objects using edges, lines, faces, polygons, or closed volumes. Lines, edges, faces, polygons, and closed volumes may be represented in various manners, e.g., non-uniform rational basis-splines (NURBS).

CAD systems manage parts or assemblies of parts of modeled objects, which are mainly specifications of geometry. In particular, CAD files contain specifications, from which geometry is generated. From geometry, a representation is generated. Specifications, geometries, and representations may be stored in a single CAD file or multiple CAD files. CAD systems include graphic tools for representing the modeled objects to designers; these tools are dedicated to the display of complex objects. For example, an assembly may contain thousands of parts. A CAD system can be used to manage models of objects, which are stored in electronic files.

CAD and CAE systems use of a variety of CAD and CAE models to represent objects. These models may be programmed in such a way that the models have the properties (e.g., physical, material, or other physics based) of the underlying real-world object or objects that the models represent. CAD/CAE models may be used to perform simulations of the real-word objects that the models represent.

SUMMARY

Simulating a human interacting with an object is a common simulation task implemented and performed by CAD and CAE systems. Performing these simulations requires setting grasping parameters. These parameters include the locations where the human model grasps the object model and the finger positioning on that object (i.e., the grasp itself). For instance, instantiating and positioning a digital human model (DHM) in a scene to simulate a manufacturing task typically requires specifying how to grasp the object(s) being manufactured, e.g., assembled.

While grasp is a popular topic in the field of digital human modeling, no solution exists which can automatically determine grasping for objects, e.g., unknown objects, while accounting for posture of the DHM performing the grasping.

An embodiment provides a grasp planner for unknown objects grasped by a DHM. Such a grasp planner takes into account final DHM posture when choosing the preferred grasp. This is particularly useful to achieve plausible DHM posture. Embodiments may be implemented in existing ergonomics frameworks, such as the Smart Posturing Engine (SPE™) framework available from Dassault Systemes, which automatically places and postures a DHM in a 3D environment, and focuses on grasping objects in virtual manufacturing contexts. Moreover, embodiments can also be implemented in existing ergonomics applications such as Dassault Systèmes'/DELMIA's "Ergonomic Workplace Design" application that helps manufacturing engineers design safe and efficient workplaces.

Another embodiment is directed to a computer-implemented method of determining position and orientation of an end effector of a DHM for grasping an object. Such an embodiment begins by receiving (i) a computer-based model of an object, (ii) a computer-based model of an environment, and (iii) an indication of position of a DHM in the environment. Next, an oriented bounding box surrounding the received model of the object is determined, where the oriented bounding box includes a plurality of faces. For each of the plurality of faces, a candidate grasp location, a candidate grasp orientation, and a candidate grasp type are determined and, then, from amongst the plurality of faces, one or more graspable faces is determined based on: (a) the determined candidate grasp location of each face, (b) the determined candidate grasp orientation of each face, (c) the received model of the environment, and (d) dimensions of each face. From amongst the determined one or more graspable faces, an optimal graspable face is identified based on a predetermined grasping hierarchy and the received indication of position of the DHM in the environment. An inverse kinematic solver is then utilized to determine position and orientation of an end effector of the DHM grasping the object based on the determined candidate grasp location, the determined candidate grasp orientation, and the determined candidate grasp type of the determined optimal graspable face.

According to an embodiment, determining the oriented bounding box comprises determining a minimum bounding box surrounding the received model of the object and determining a principal axis of inertia of the object based on the received model of the object. Such an embodiment orients the determined minimum bounding box based on the determined principal axis of inertia and sets the oriented minimum bounding box as the oriented bounding box surrounding the received model of the object. Yet another embodiment determines a candidate grasp orientation for a given face of the plurality of faces by setting the candidate grasp orientation for the given face based on the determined principal axis of inertia of the object.

An embodiment determines a candidate grasp location for a given face of the plurality of faces by, first, calculating a geometrical center of the object based on the received model of the object. Such an embodiment then projects from the calculated geometrical center of the object to the given face and sets location of an intersection of the projection and the given face as the candidate grasp location for the given face.

Another embodiment determines a candidate grasp type for a given face of the plurality of faces by calculating length of a first edge and a second edge of the given face, wherein the first edge and the second edge are perpendicular to each other. Such an embodiment also calculates length of a face edge normal to the first edge and the second edge. In turn, the candidate grasp type for the given face is determined based on: (i) the calculated length of the first edge, (ii) the calculated length of the second edge, and (iii) the calculated length of the face edge normal to the first edge and the second edge.

According to an embodiment, each determined candidate grasp type is one of: a pinch type, a medium-wrap type, and a precision sphere type.

As noted above, an embodiment determines one or more graspable faces based on: (a) the determined candidate grasp location of each face, (b) the determined candidate grasp orientation of each face, (c) the received model of the environment, and (d) the dimensions of each face. According to an embodiment, such an embodiment identifies a given face as a graspable face if (i) the end effector of the DHM, at the determined candidate grasp location in the determined candidate grasp orientation, does not collide with an element in the model of the environment and (ii) dimensions of the given face do not exceed a threshold.

In yet another embodiment, the DHM includes a left end effector and a right end effector. Such an embodiment may further include receiving an indication of the end effector, from amongst the left end effector and the right end effector, of the DHM grasping the object. This indication may be used to select the predetermined grasping hierarchy.

Embodiments may also configure the inverse kinematic solver. For instance, one such embodiment configures the inverse kinematic solver to have an unconstrained rotation degree of freedom along an axis normal to the determined optimal graspable face.

Another embodiment applies a respective label to each face of the plurality of faces. In one such embodiment, the respective label of each face is a function of position of the DHM in relation to the face. In such an embodiment, the predetermined grasp hierarchy may indicate a preferred order of graspable faces as a function of each respective label.

Embodiments can simulate physical interaction between the DHM and the object using the determined position and orientation of the end effector. Such functionality can be used to design, amongst other examples, real-world manufacturing lines, and modify/improve real-world environments to improve, for instance, ergonomics.

Yet another embodiment is directed to a system that includes a processor and a memory with computer code instructions stored thereon. In such an embodiment, the processor and the memory, with the computer code instructions, are configured to cause the system to implement any embodiments or combination of embodiments described herein.

Another embodiment is directed to a cloud computing implementation for determining position and orientation of an end effector of a DHM for grasping an object. Such an embodiment is directed to a computer program product executed by a server in communication across a network with one or more clients. The computer program product comprises program instructions which, when executed by a processor, causes the processor to implement any embodiments or combination of embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
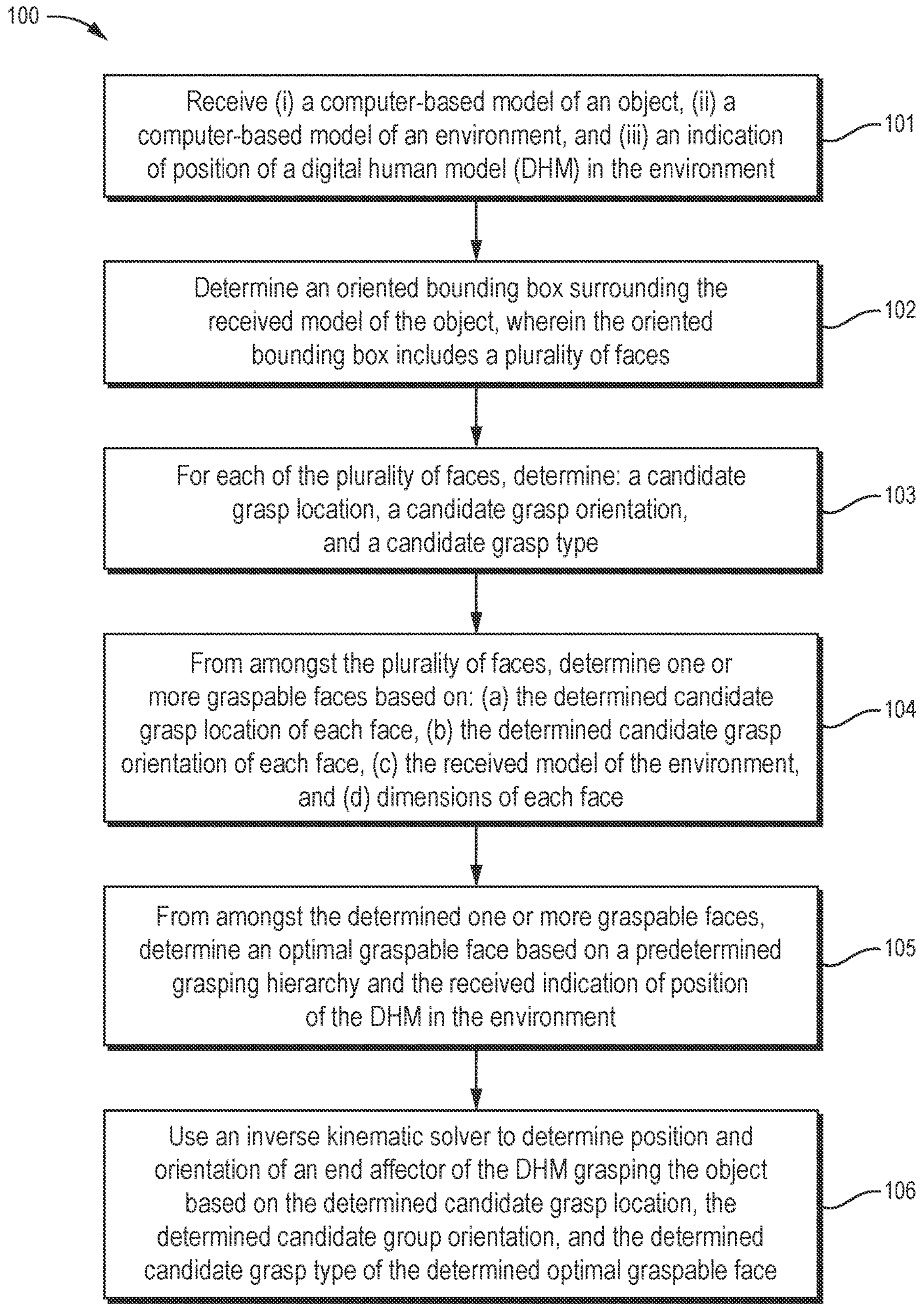
FIG. 1 is a flowchart of a method for determining position and orientation of an end effector of a DHM for grasping an object according to an embodiment.

A description of example embodiments follows.

Digital Human Models (DHMs) offer the unique possibility to simulate worker tasks in a three-dimensional (3D) environment. This is particularly useful in the manufacturing world because such simulations allow users to, amongst other examples, detect ergonomic problems before production lines are built and detect and correct ergonomic problems in existing production lines. This does not replace traditional ergonomics, but can help detect problems in the virtual stage of the design phase to avoid costly changes on the production line in the real world.

Today, different DHMs are available in commercial products: DELMIA Ergonomics (Dassault Systemes), Jack™ (Badler 1999), and Santos® Pro (VSR 2004). Zhou (2009) explained that the biggest challenge in DHM applications is the low efficiency of the manikin positioning in 3D, due to the time-consuming processes of manual posture creation and moving each joint separately. Jack (Cort 2019) and IMMA (Hanson 2014) proposed methods to automatically posture a manikin in a 3D environment. However, the posture prediction process in these existing methods is not fully automatic because the manikin must be placed close to the object by the user before resolving the posture. However, this is a step forward to reduce the time the manikin posture creation phase takes.

Dassault Systèmes released an application called "Ergonomic Workplace Design" (EWD) that helps manufacturing engineers design safe and efficient workplaces in 3D. The Smart Posture Engine (SPE™) technology was developed to reach that particular goal. The SPE is a framework that performs an autonomous posturing of a DHM based on minimal user inputs (Lemieux 2017), (Lemieux 2016), (Zeighami 2019).

Embodiments, which can be implemented as part of the SPE™ focus on the grasp planning portion of automatic posture generation. Bohg (2013) divided the grasp problem into three categories based on whether the object to grasp is: (1) known, (2) familiar, or (3) unknown. Known objects are previously encountered objects for which grasps have been previously generated. Familiar objects are new objects that can be grasped in a similar way to a known object. Unknown objects are objects for which there is no prior grasp experience.

As explained by (Zhou 2009), grasp planners typically try to find the best hand location on the object without considering the final DHM posture. Such methods often produce results with unrealistic final postures when reaching for the object.

A grasping algorithm was described in Bourret 2019 to automatically grasp tools that were considered known objects. The objective of this tool grasping algorithm was to have a better DHM posture when grasping the tools by allowing range of motion to the hand on the object. A method has also been proposed to automatically find grasping cues on familiar tools, so as to allow the grasp planner to grasp familiar objects automatically (Macloud 2019) (Macloud 2021).

Embodiments introduce a complementary grasp planner for grasping, e.g., with a single hand, unknown objects, which may be referred to herein as “parts”. Like methods used for known and familiar objects, embodiments provide a grasp planner that accounts for different aspects of the DHM final posture when choosing the proper way to grasp the unknown object. Amongst other applications, embodiments determine a visually plausible grasp on unknown objects in a manufacturing context.

FIG. 1 is a flowchart of a computer-implemented method 100 for determining position and orientation of an end effector of a DHM for grasping an object according to an embodiment.

The method 100 starts at step 101 by receiving (i) a computer-based model of an object, (ii) a computer-based model of an environment, and (iii) an indication of position of a DHM in the environment. Next, at step 102, an oriented bounding box surrounding the received model of the object is determined. In such an embodiment, the determined oriented bounding box includes a plurality of faces. In turn, at step 103, for each of the plurality of faces, a candidate grasp location, a candidate grasp orientation, and a candidate grasp type are determined. Then, at step 104, from amongst the plurality of faces, one or more graspable faces is determined based on: (a) the determined candidate grasp location of each face, (b) the determined candidate grasp orientation of each face, (c) the received model of the environment, and (d) dimensions of each face. From amongst the determined one or more graspable faces, an optimal graspable face is identified at step 105 based on a predetermined grasping hierarchy and the received indication of position of the DHM in the environment. An inverse kinematic solver is then utilized at step 106 to determine position and orientation of an end effector of the DHM grasping the object based on the determined candidate grasp location, the determined candidate grasp orientation, and the determined candidate grasp type of the determined optimal graspable face.

Figure 4A:
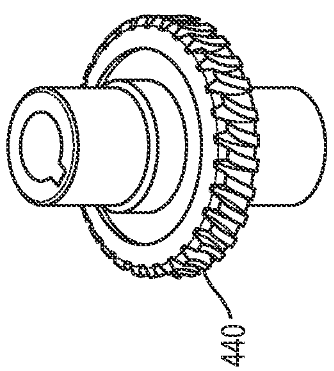
FIGS. 4A-B illustrate inputs that may be employed by embodiments.
Figure 4B:
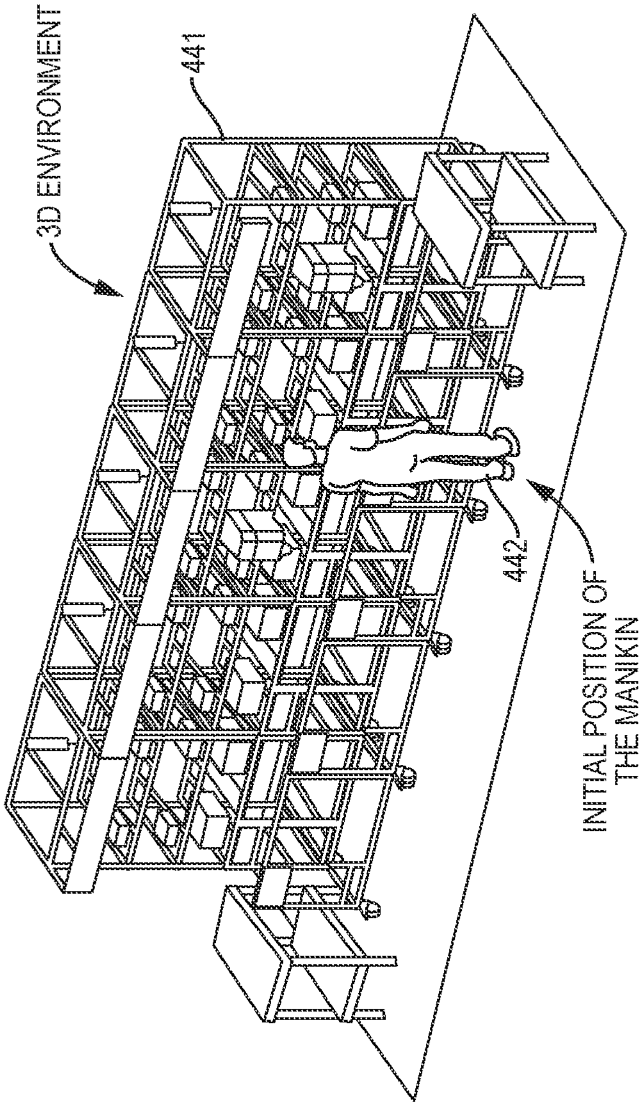

The method 100 is computer-implemented and, as such, the models and indication received at step 101 may be received from any memory or other such data source that is communicatively coupled or capable of being communicatively coupled to the processor(s) implementing the method 100. In embodiments, the model received at step 101 may be any computer-based models known in the art. For instance, according to an embodiment, the model of the object and the model of the environment are each CAD models. Moreover, the indication of position received at step 101 indicates location of the DHM in the three-dimensional space of the environment as represented by the model of the environment. FIGS. 4A-B, as described hereinbelow, illustrate example input data that may be received at step 101 of the method 100. Further, the models and position indication received at step 101 may be based on real-world measurements of an object and environment. In such an embodiment, the method 100 may be used to evaluate the real-world interaction between a human and the object in the real-world environment.

According to an embodiment of the method 100, determining the oriented bounding box at step 102 comprises determining a minimum bounding box surrounding the received model of the object and determining a principal axis of inertia of the object based on the received model of the object. Such an embodiment, at step 102, orients the determined minimum bounding box based on the determined principal axis of inertia and sets the oriented minimum bounding box as the oriented bounding box surrounding the received model of the object. In an embodiment of the method 100, the oriented bounding box is determined at step 102 using the functionality described hereinbelow in relation to FIG. 6. For instance, such an embodiment may determine each principal axis of inertia of the object and orient the bounding box based upon each principal axis of inertia.

Step 103 of the method 100 determines a candidate grasp location, a candidate grasp orientation, and a candidate grasp type for each face of the bounding box determined at step 102.

In an embodiment, a candidate grasp orientation for a given face of the plurality of faces is determined at step 103 by setting the candidate grasp orientation for the given face based on a determined principal axis of inertia of the object. Another embodiment of the method 100 implements the functionality described hereinbelow in relation to FIG. 8, at step 103, to determine the candidate grasp orientation of each face.

An example implementation of the method 100 determines a candidate grasp location for a given face of the plurality of faces at step 103 by, first, calculating a geometrical center of the object based on the model of the object received at step 101. Such an embodiment projects from the calculated geometrical center of the object to the given face and sets location of an intersection of the projection and the given face as the candidate grasp location for the given face. Such functionality may be implemented for each face of the plurality of faces of the bounding box. In an example embodiment, candidate grasp locations are determined at step 103 utilizing the functionality described hereinbelow in relation to FIG. 7.

Figure 9:
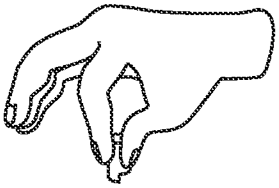
FIG. 9 is a table showing grasp types that may be determined by embodiments.
Figure 9:
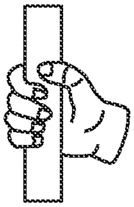
Figure 9:

Embodiments of the method 100 may identify, at step 103, one of a plurality of different grasp types for each face. FIG. 9, described hereinbelow, illustrates example candidate grasp types that may be determined at step 103. According to an embodiment, each candidate grasp type determined at step 103 is one of: a pinch type, a medium-wrap type, and a precision sphere type. Moreover, it is noted that embodiments are not limited to the foregoing grasp-types and embodiments, at step 103, may determine candidate grasps of any type known in the art.

Another embodiment of the method 100 determines a candidate grasp type for a given face of the plurality of faces at step 103 by calculating length of a first edge and a second edge of the given face and calculating length of a face edge normal to the first edge and the second edge. In such an embodiment, the first edge and the second edge are perpendicular to each other. In turn, the candidate grasp type for the given face is determined at step 103 based on: (i) the calculated length of the first edge, (ii) the calculated length of the second edge, and (iii) the calculated length of the face edge normal to the first edge and the second edge. An example of such functionality is described hereinbelow in relation to FIG. 11.

At step 104, the method 100 determines one or more graspable faces based on: (a) the determined candidate grasp location of each face, (b) the determined candidate grasp orientation of each face, (c) the received model of the environment, and (d) the dimensions of each face. According to an embodiment of the method 100, the determining at step 104 identifies a given face as a graspable face if (i) the end effector of the DHM, at the determined candidate grasp location in the determined candidate grasp orientation, does not collide with an element in the model of the environment and (ii) dimensions of the given face do not exceed a threshold. An embodiment of the method 100 implements the functionality described hereinbelow in relation to FIG. 13 at step 104 to determine one or more graspable faces.

At step 105, the method 100 determines an optimal graspable face based on a predetermined grasping hierarchy and the received indication of position of the DHM in the environment. Table 1, described herein below, is an example hierarchy that may be used in embodiments. According to an embodiment, the indicated position of the DHM dictates the hierarchy that is utilized at step 105 to determine the optimal graspable face.

In yet another embodiment of the method 100, the DHM includes a left end effector and a right end effector. Such an embodiment may further include receiving, e.g., at step 101, an indication of the end effector, from amongst the left end effector and the right end effector, of the DHM grasping the object. Such an embodiment may select the predetermined grasping hierarchy used at step 105 based on the received indication of the end effector. In other words, such an embodiment uses a different hierarchy depending on the end effector (right or left) performing the grasping.

Another embodiment of the method 100 applies a respective label to each face of the plurality of faces. In such an embodiment, each label is a function of position of the DHM in relation to the face. In such an embodiment, the predetermined grasp hierarchy utilized at step 105 indicates a preferred order of graspable faces as a function of the labels. This hierarchy can be used to select the optimal face as a function of each respective label. An example of such functionality is described hereinbelow in relation to FIG. 12.

Figure 14:
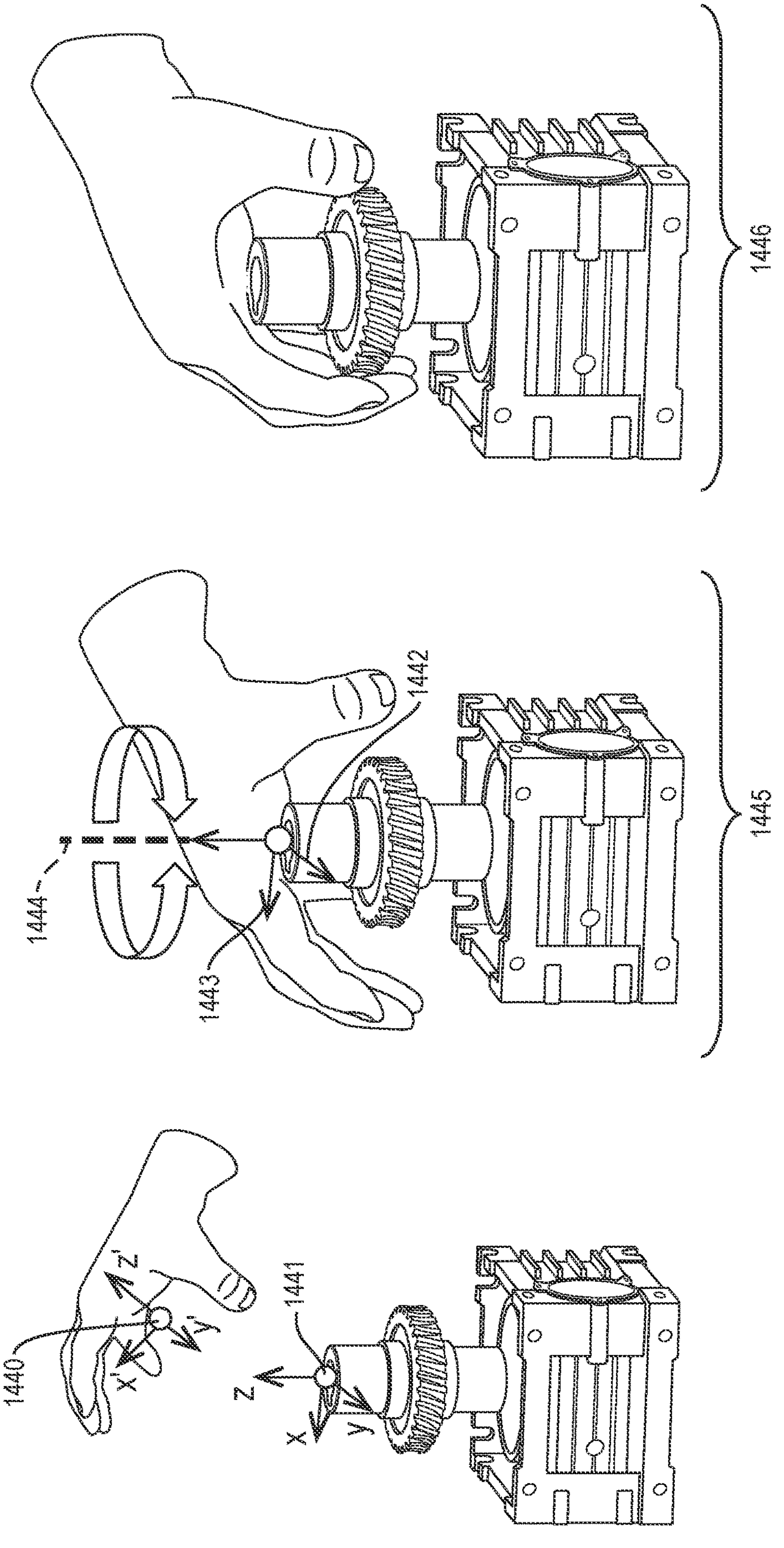
FIG. 14 illustrates steps of an inverse kinematic solver determining a grasp according to an embodiment.
Figure 15A:
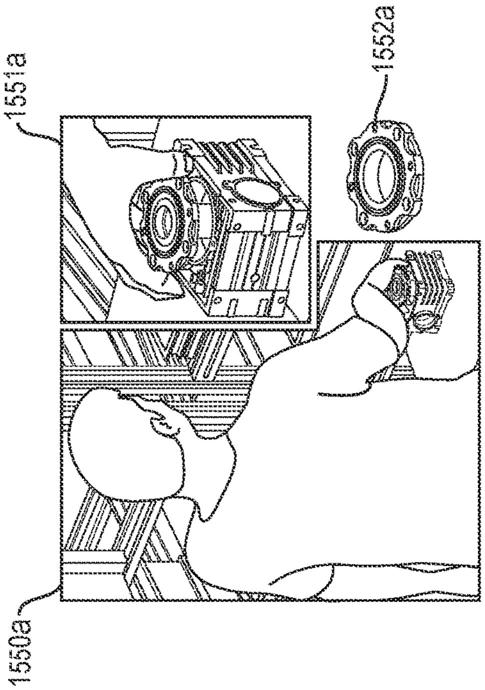
FIGS. 15A-D depict grasping results determined using embodiments.
Figure 15B:
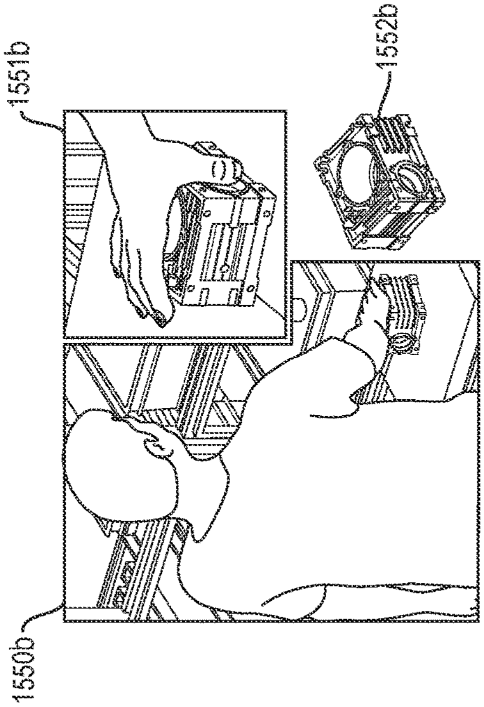
Figure 15C:
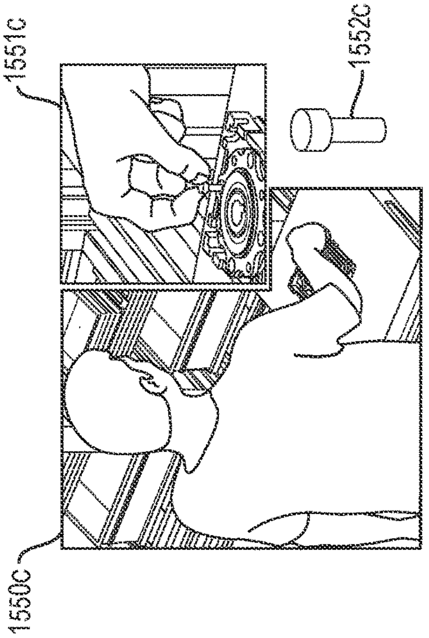
Figure 15D:
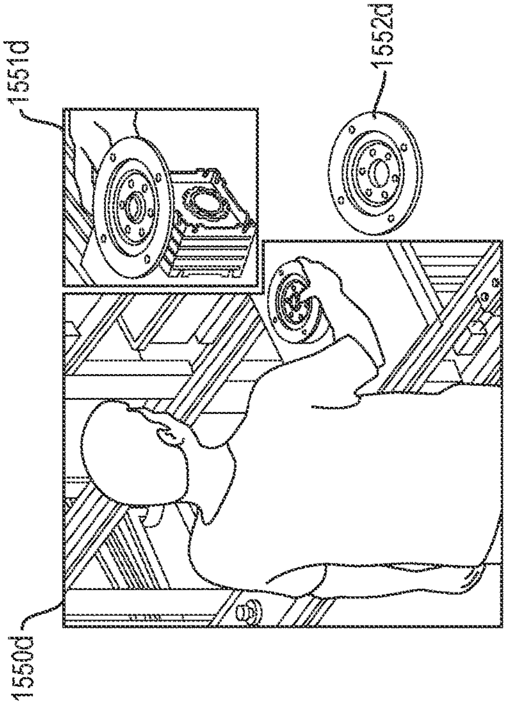

Embodiments of the method 100 may configure the inverse kinematic solver used at step 106. For instance, one such embodiment configures the inverse kinematic solver to have an unconstrained rotation degree of freedom along an axis normal to the determined optimal graspable face. FIG. 14 illustrates functionality of an inverse kinematic solver that may be implemented at step 106 to determine the position and orientation of the end effector of the DHM grasping the object.

Yet another example embodiment of the method 100 simulates physical interaction between the DHM and the object using the determined position and orientation of the end effector. Results of such a simulation may, amongst other examples, be used to improve ergonomics for a human in a real-world environment. For instance, if the method 100 is implemented during the design stage of a manufacturing line, results of the simulation may be used to improve ergonomics in the design and ultimately the real-world manufacturing line that is built. Similarly, the method 100 can be used to evaluate an existing real-world manufacturing line. In such an embodiment, the models received at step 101 are based on measurements of the real-world manufacturing line and a simulation performed using the determined grasp from step 106 indicates behavior of the human in the real-world environment. The determined behavior may, for instance, indicate that there is an ergonomics issue with the manufacturing line and a shelf should be lowered so that the human can more easily grasp the object. In this way, embodiments can be used to improve real-world environments.

Virtual Environment Example

Figure 2:
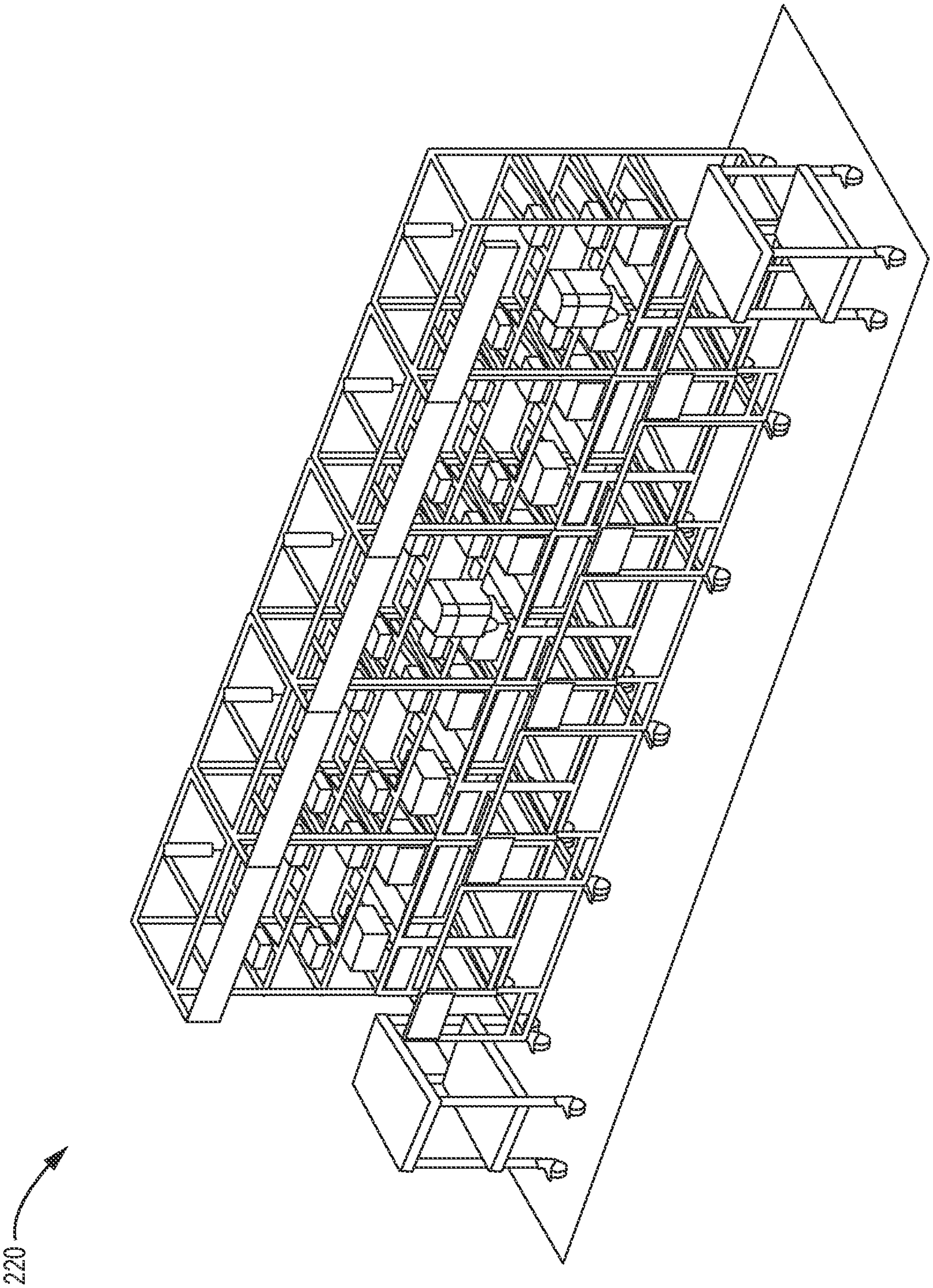
FIG. 2 illustrates a computer-based model of an environment that may be utilized in embodiments.
Figure 3B:
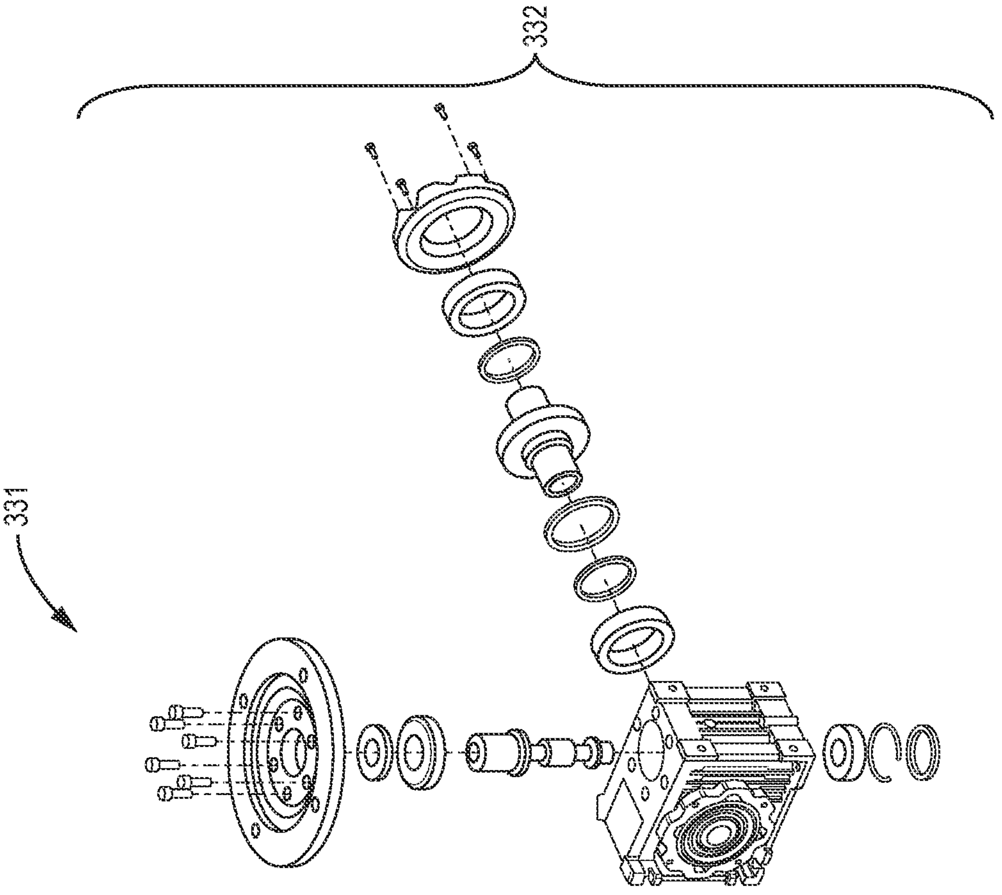
FIG. 3B is an exploded view of the object of FIG. 3A.
Figure 3A:
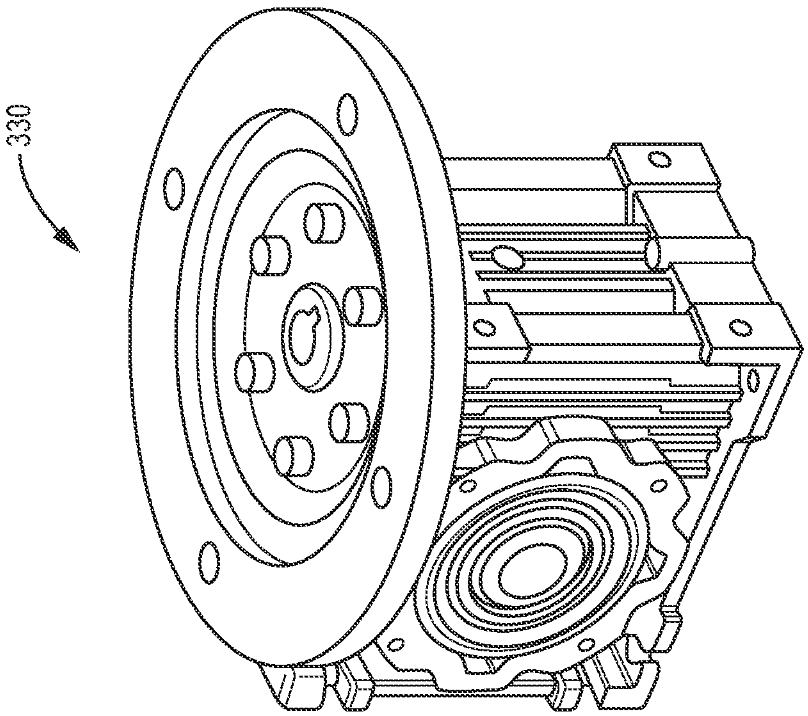
FIG. 3A is an example computer-based model of an object that may be used in embodiments.

Amongst other examples, embodiments provide methodologies to determine grasps of unknown objects in manufacturing contexts. One such example context is the production line environment 220 illustrated in FIG. 2. According to an embodiment, the object for which the grasp is determined is a part (e.g., one of the parts 332 shown in the exploded view 331 of FIG. 3B) that composes a product (e.g., the product 330 of FIG. 3A) assembled on a production line (e.g., the production line environment 220). Applications of grasp planning methodologies applied to the production line environment 220 of FIG. 2 where the product 330 of FIG. 3A (or one of the parts 332 of FIG. 3B) is grasped are described throughout this document to explain and illustrate embodiments.

Inputs and Outputs

The inputs of an embodiment are: a 3D model of an object to grasp, a 3D model of an environment, and an indication (e.g., 3D coordinates) of initial position of a DHM in the 3D environment. FIG. 4A illustrates an example model 440 of an object to grasp and FIG. 4B illustrates an example model 441 of an environment, e.g., a production line. FIG. 4B also depicts an initial position 442 of the DHM in the environment model 441. In an embodiment, this initial position 442 is automatically determined using functionality described in U.S. Patent Publication No. 2023/0021942 A1. In other embodiments, the position 442 is determined using one of a variety of different options, including: functionality provided by the 3DExperience platform, a user selected existing method for setting DHM positions, or setting of the position manually. Embodiments may also receive, as input, an indication of which DHM end effector (e.g., right hand or left hand) is used to grasp the object.

The outputs of embodiments may include an indication grasp type to use and a grasp target, e.g., position and orientation of an end effector. This grasp type and grasp target can be used in a DHM posture solving method, such as an inverse kinematic method, which is an element of the SPE framework, to determine position and orientation of the upper limb end effector (i.e., the hand). According to an embodiment, the end effector can reach the target on the object with the DHM using an inverse kinematic solver.

Example Method

Figure 5:
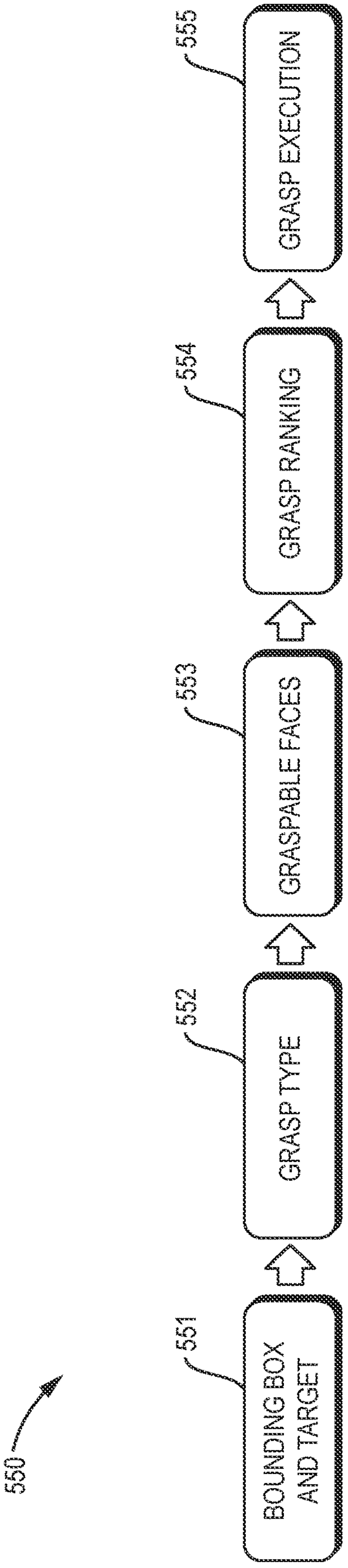
FIG. 5 is a flowchart of a method for determining grasp according to an embodiment.

FIG. 5 is a flowchart for determining grasp according to an embodiment. The method 550 begins at step 551 by determining a bounding box of the object to be grasped and determining candidate grasp target locations and orientations. At step 552, grasp types are determined for each of the candidate grasp target locations and, at step 553, graspable faces of the bounding box are identified. The graspable faces determined at step 553 are then ranked at step 554 to determine an optimal graspable face. This optimal graspable face is used at step 555 to execute the grasp and determine the position and orientation of the end effector.

Bounding Box and Target Calculation

Figure 6:
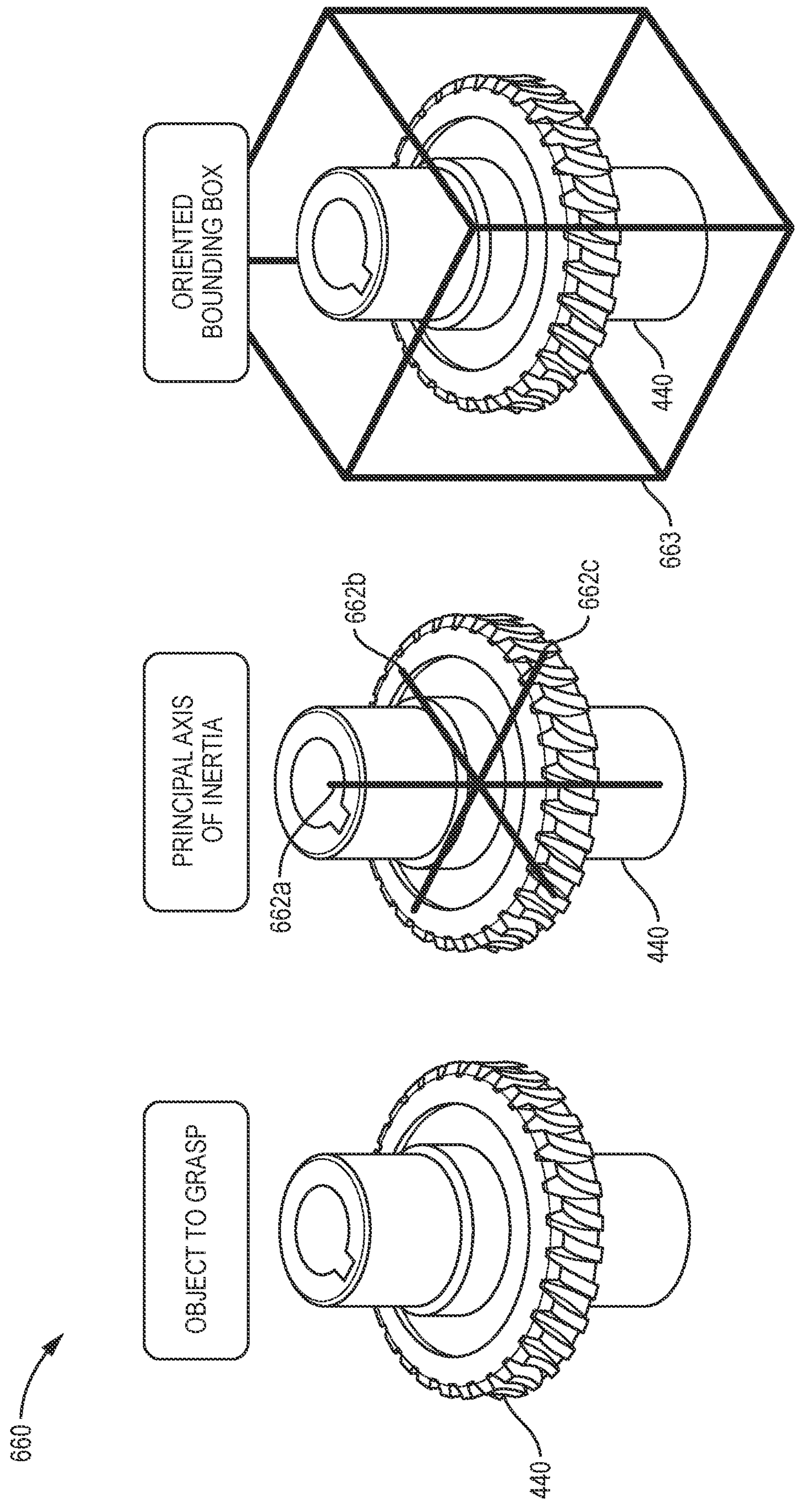
FIG. 6 illustrates steps of a method for determining a bounding box that may be implemented in embodiments.

Embodiments, e.g., at step 551 of the method 550, approximate the object to be grasped using the object's minimum oriented bounding box. FIG. 6 illustrates a method 660 for determining an object's minimum oriented bounding box according to an embodiment. The method 660 begins with a model 440 of the object to be grasped. Next, the principal axes of inertia 662*a-c* of the object are identified. In an embodiment, the principal axes 662*a-c* are determined using methods known to those of skill in the art, such as functionality available in the 3DExperience platform. For instance, in an embodiment, the principal axes of inertia 662*a-c* are axes orthogonal to a bounding box of the model 440 or are based on eigenvectors of the model 440. In turn, the bounding box 663 is oriented along the principal axes of inertia 662*a-c*. In this way, the method 660 determines the minimum oriented bounding box 663 to approximate the object 440. It is noted that in an embodiment, the bounding box 663 is determined using procedures known to those of skill in the art, such as functionality provided by the 3DExperience platform.

Figure 7:
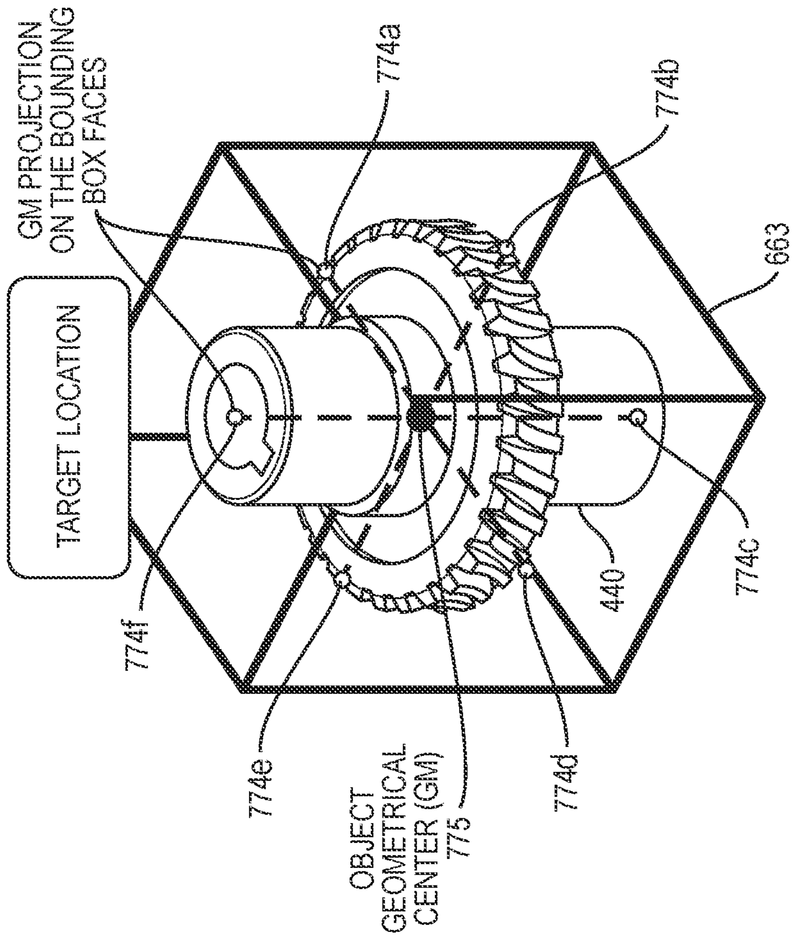
FIG. 7 depicts example candidate grasping locations that may be determined by embodiments.

Embodiments use the determined bounding box 663 and associate, e.g., in computer memory, a potential grasp target with each face of the bounding box 663. FIG. 7 illustrates an example where the candidate grasping locations 774*a-f* are determined for the object 440 using the bounding box 663. In an embodiment, the geometrical center 775 of the object 440 is calculated. According to an embodiment, the geometrical center 775 is determined using procedures known to those of skill in the art, such as functionality provided by the 3DExperience platform. Further, in an embodiment, the geometrical center 775 is a centroid of external 3D coordinates of vertices of the bounding box 663. To continue, the geometrical center 775 is then projected on each of the faces of the bounding box 663. The intersection of the projections from the geometrical center 775 with the faces are the candidate target grasp locations 774*a-f* Such an embodiment follows the heuristic that humans prefer to grasp an object close to the object's center of mass, likely to reduce effort on joints (Bekey 1993). However, because, in such an embodiment, the distribution of the mass of the object 440 is not known embodiments use the geometrical center 775.

Figure 8:
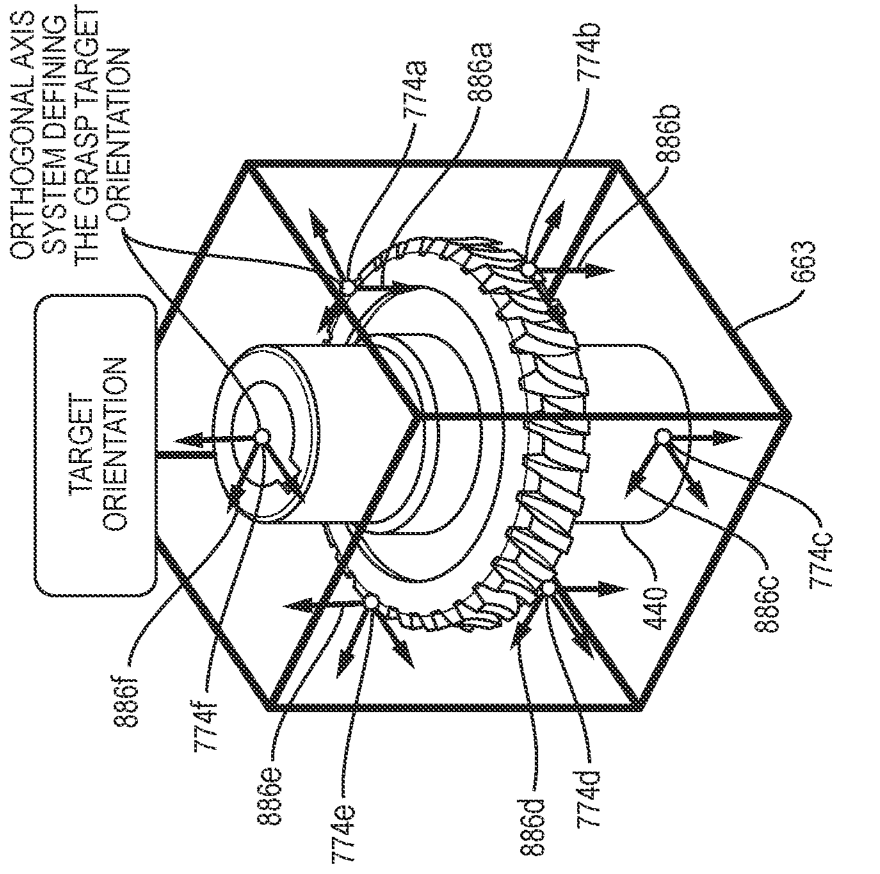
FIG. 8 depicts example candidate grasping orientations that may be determined by embodiments.

Embodiments also determine candidate grasp orientations for each face of the bounding box, i.e., for each candidate grasping location. FIG. 8 illustrates example orientations 886*a-f* determined for the object 440 using the bounding box 663. According to an embodiment, the orientations 886*a-f*, i.e., hand orientation, for each target location 774*a-f*, is defined by reusing the orientation of the minimum bounding box 663 determined based on the principal axis of inertia 662. In an embodiment, the z axes of the orientations 886*a-f* are each normal to their respective bounding box face and the x and y axes of the orientations 886*a-f* can be determined arbitrarily or in accordance with any desired, e.g., user-desired, procedure.

Grasp Type Determination

Feix 2015 described a taxonomy of different grasps that a human can perform. In Feix's work, a statistical analysis was performed of the different grasp characteristics based on measuring the object (size, weight), and grasp frequency for each grasp type. An embodiment leverages this statistical analysis and uses three of the most frequently used grasp types. FIG. 9 is a table 990 showing grasp types 991 and images 992 thereof, that are utilized in an embodiment. In such an embodiment the grasp types 991 include a pinch grasp 991*a*, medium wrap grasp 991*b*, and precision sphere grasp 991*c*. By using three of the most frequently used grasps 991*a-c* such an embodiment provides ample coverage of objects grasped in a manufacturing context.

Figure 10:
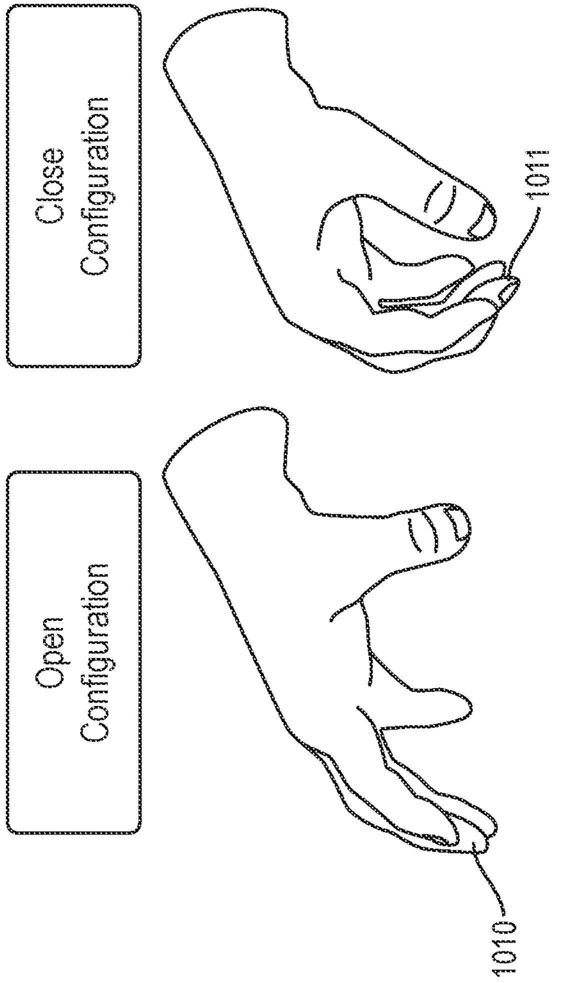
FIG. 10 depicts example end effector configurations that may be employed in embodiments.

According to an embodiment, for each grasp type, e.g., 991*a-c*, an open and closed hand configuration is created, e.g., manually by a user so as to correspond to certain grasp types, and used during hand closure on the object. FIG. 10 illustrates an example open configuration 1010 and closed configuration 1011 for the medium wrap grasp type 991*b*. These open and closed hand configurations can be re-used during different implementations of embodiments.

Figure 11:
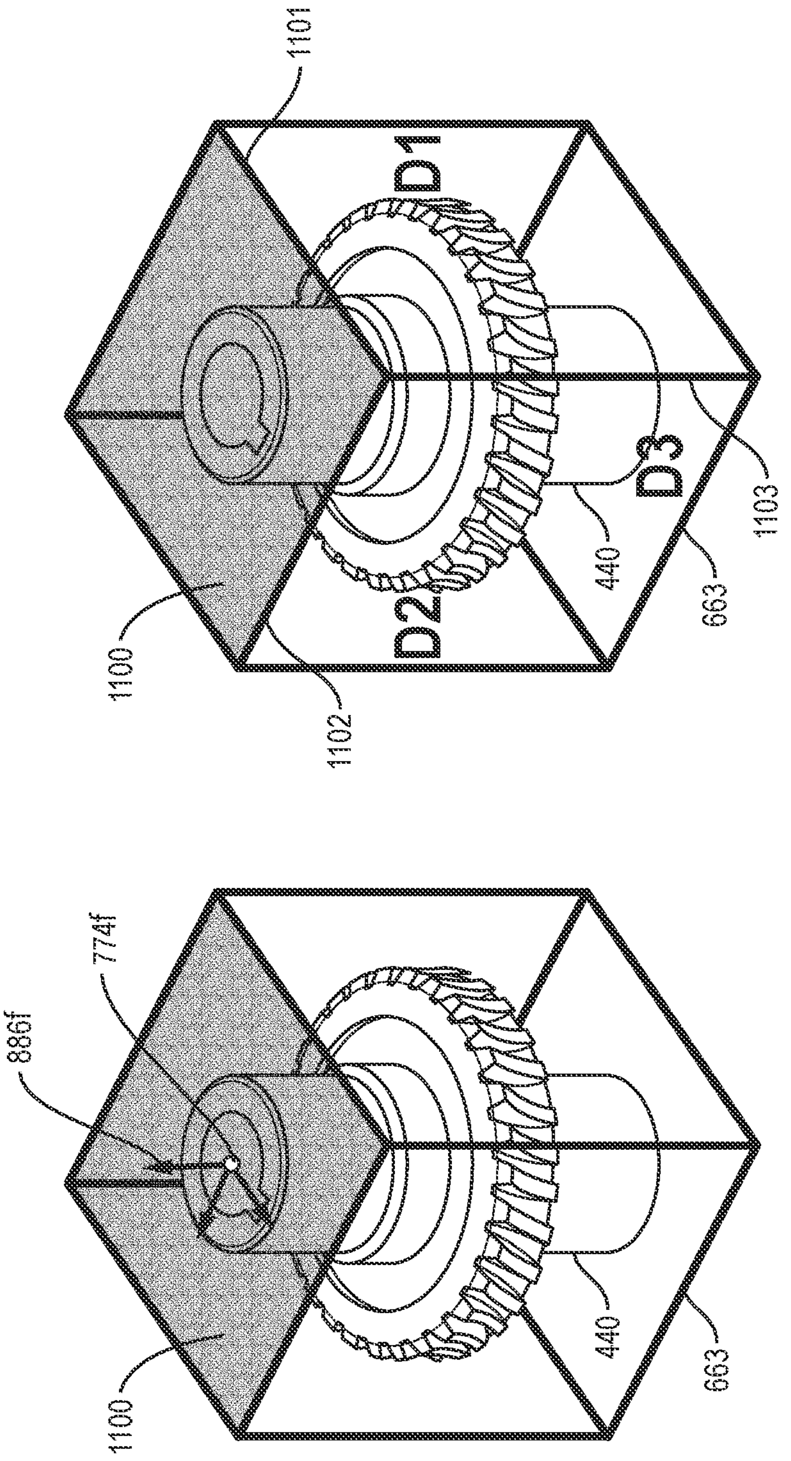
FIG. 11 illustrates functionality of characterizing faces of a bounding box according to an embodiment.

From amongst the various grasp types, e.g., 991*a-c*, embodiments select which grasp type to use for each face of the bounding box, e.g., each target grasp location 774*a-f*. An example embodiment uses dimensions of the bounding box faces to determine the grasp type for each face, e.g., each candidate grasp target location 774*a-f* and orientation 886*a-f* FIG. 11 illustrates functionality for determining the grasp type for the candidate location 774*f* and candidate orientation 886*f*, which are on the face 1100. Further, it is noted that while FIG. 11 illustrates functionality for the face 1100, embodiments determine a candidate grasp type for each face of the bounding box 663. For the face 1100 (which is the face of candidate location 774*f* and orientation 886*f*) two dimensions 1101 and 1102 are determined, i.e., the length and width of the face are determined. Further, the dimension 1103 of an edge normal to the edges of the dimensions 1101 and 1102 is determined. In summary, the dimensions 1101 and 1102 are the dimensions of the face 1100 and the dimension 1103 is the dimension of an edge normal to the face 1100.

These dimensions 1101, 1102, and 1103 are then used in the following logic to select the grasp type to use:

If Dimension 1101<60 mm And Dimension 1102<35 mm
  Grasp Type=Pinch
Else If Dimension 1101≤90 mm And Dimension 1102≤90 mm And Dimension 1103≤50 mm
  Grasp Type=Precision sphere
Else
  Grasp Type=Medium Wrap Based upon the above logic, a small object is grasped with a pinch grasp 991*a* and a bigger object that has a small 1103 dimension, e.g., a flat object, is grasped using a precision sphere grasp 991*c* (using the tip of the fingers). Otherwise, a medium wrap grasp 991*b* is used. The values in the above logic are based upon a Feix 2014 article and have been refined based on results of testing performed on different manufacturing parts. Further, it is noted that embodiments are not limited to using the above logic and specific dimensions therein and embodiments can consider different grasp types and use different tolerances, i.e., dimensions for selecting grasp types.

Face Labeling

Figure 12:
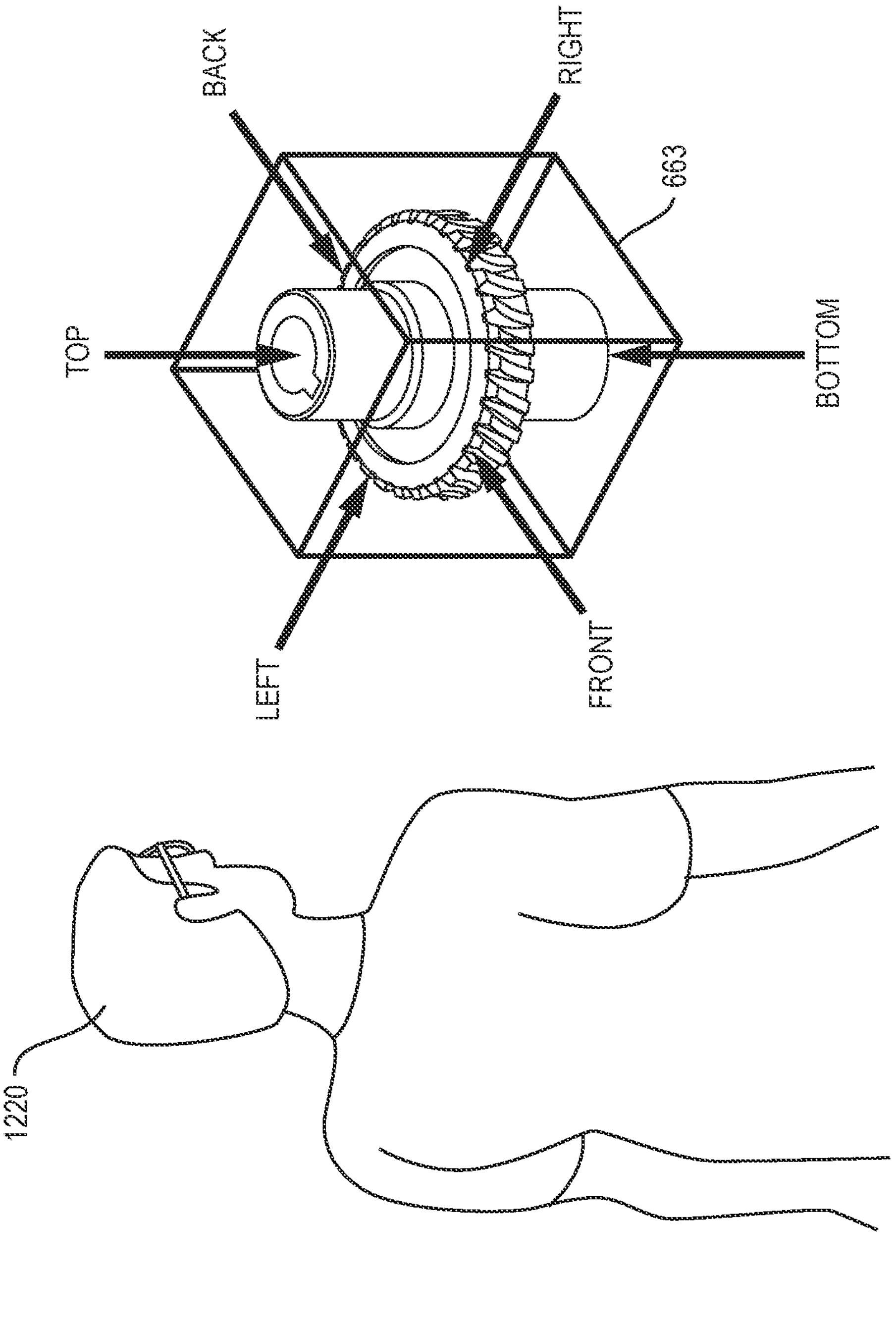
FIG. 12 depicts a bounding box labeling technique that may be implemented in embodiments.

An embodiment labels faces of the bounding box. According to an embodiment, the labeling enables (i) ranking of the grasps and (ii) using heuristics to determine an optimal grasping location. FIG. 12 illustrates an example of labeling where each face of the bounding box 663 is labeled depending on its position relative to the manikin 1220 initial position. The six faces labels used in FIG. 12 are: front, back, left, right, top, and bottom. Further, it is noted that while FIG. 12 illustrates labelling based upon position of the manikin, embodiments are not limited to such a method and embodiments can use any labelling technique that facilitates ranking/choosing target locations.

Graspable Faces

Embodiments determine which faces of the bounding box are graspable. In one such embodiment checks are performed to identify graspable faces.

Figure 13:
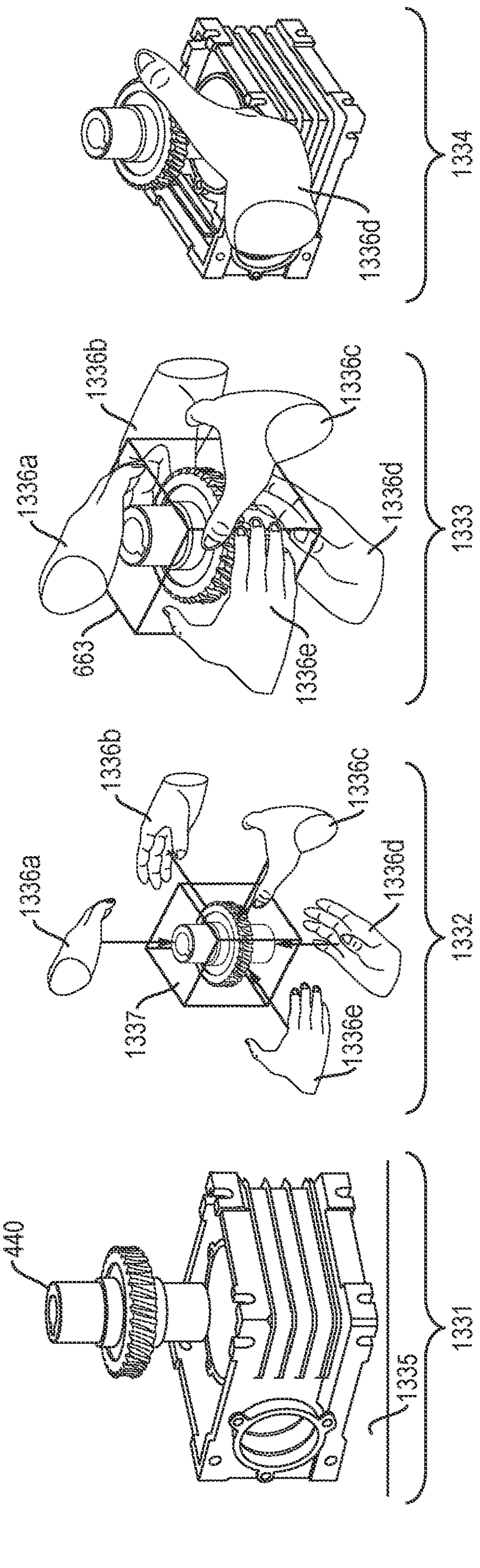
FIG. 13 depicts steps of a method for identifying graspable faces according to an embodiment.

One such embodiment, first, evaluates accessibility of each face. FIG. 13 depicts steps of a method 1330 for identifying graspable faces according to an embodiment. The method 1330 begins at step 1331 with the model of the object 440 and a model of the environment 1335. Next, at step 1332, an isolated hand 1336*a-e* is positioned at the targets location, e.g., 774*a-f*, in an open position, e.g., 1010. Further, the method 1330 can receive an indication of the hand being used to grasp the object and eliminate the face of the bounding box opposite the grasping hand. Such a face is eliminated because it can yield unrealistic grasps and postures. For instance, in the illustrated method 1330, the right hand is grasping the object 440 and the face 1337 is not considered. At step 1333, the method 1330 checks each face to determine if the face is accessible to the hand 1336*a-e*. If a collision between the isolated hand 1336*a-e* and the environment (shown by the model 1335) around the object (shown by the model 440) is detected, then the face is considered not accessible and is ignored when choosing the final grasp. In the example of FIG. 13, the final step 1334 illustrates that the bottom face is not accessible to the hand 1336*d*. While the bottom face is determined to not be accessible, the top, back, right, and front face are determined to be accessible to the hands 1336*a*, 1336*b*, 1336*c*, and 1336*e*, respectively. As such, going forward, the faces (and their corresponding candidate locations and orientations) accessible to the hands 1336*a*, 1336*b*, 1336*c*, and 1336*e* are candidates for determining an optimal graspable face.

After checking accessibility, the second check when identifying graspable faces is based on face dimensions. For each of the accessible faces, dimensions, e.g., 1101 and 1102 shown in the FIG. 11, are checked and if a dimension is greater than 100 mm then the face is considered too big to be grasped. This limit value follows a (Feix 2014) observation regarding dimension limits that a human can grasp. Returning to the faces accessible to the hands 1336*a*, 1336*b*, 1336*c*, and 1336*e*, each of said faces has dimensions under 100 mm and, thus, remain candidate graspable faces. Thus, in this example, the top, back, right, and front faces are candidate graspable faces.

Grasp Ranking

After identifying the graspable faces, embodiments rank the faces to determine an optimal graspable face. Table 1 below illustrates bounding box face rankings according to an embodiment.

TABLE 1

| Bounding Box Face Rankings | | | | | |
|---|---|---|---|---|---|
| Grasp Side | Top | Right/Left | Bottom | Front | Back |
| Rank | 1 | 2 | 3 | 4 | 5 |

Table 1 shows that when the top side is graspable, it is considered the optimal grasping face. If the top side is not graspable, i.e., it is inaccessible or too big, the next face in the ranking that is graspable (right/left, bottom, front, back) is considered the optimal graspable face. If no face is graspable, the top face is chosen. In an embodiment using Table 1, the second rank is right/left, and the side selected is based on which end effector is involved in the grasping. Specifically, if the left end effector, e.g., hand, is used to grasp the object, then, the second rank is the left side and if the right hand is used to grasp the object, then, the second rank is the right side. In an embodiment, when grasping an object with the right hand, the left side is considered to not be graspable because it would result in the DHM having to be in an unrealistic posture. A similar logic is also applied when grasping with the left hand, i.e., the right face is considered ungraspable.

Grasp Execution

After determining an optimal face to grasp, embodiments determine the grasp, i.e., position and orientation, of an end effector. An embodiment determines the grasp using the determined candidate grasp location, the determined candidate grasp orientation, and the determined candidate grasp type of the determined optimal graspable face using an inverse kinematic solver.

FIG. 14 illustrates steps implemented by the inverse kinematic solver to determine the grasp according to an embodiment. Such an embodiment provides the target grasp location associated with the selected face to the inverse kinematic solver. The solver then matches the upper limb end effector frame 1440 with the target frame 1441. In such an embodiment, the target frame is the candidate location of the optimal face and the candidate orientation of the optimal face. In the embodiment depicted in FIG. 14 a more probable posture is determined by allowing a rotation degree of freedom along each direction of rotation 1442, 1443, and 1444 of the end effector. In an embodiment, the rotation about the hand palm plane is kept free (direction 1444, i.e., normal to the optimal grasping face) while the other rotations (1442 and 1443) are limited to some extent based on empirical tests (e.g. ±10 to ±30°). This gives the inverse kinematic solver more room to find a visually plausible posture while avoiding constraining the wrist too much. Once the target is reached, the hand closes on the object. The hand starts in its open configuration for the determined candidate grasp type of the optimal graspable face (shown by the visualization 1445) and each finger is moved toward its closed configuration for the determined candidate grasp type for the determined candidate grasp type of the optimal graspable face (shown by the visualization 1446). When a collision is detected between the finger and the object to grasp, the closure ends for that finger. The closure continues until all fingers are in collision or until all fingers reach their closed configuration. The position and orientation of the end effector at this stage, all fingers in collision or at the closed configuration, is the grasp.

Example Results

FIGS. 15A-D illustrate grasps on a gearbox assembly line determined by embodiments. The grasps were determined using embodiments, e.g., the method 100 of FIG. 1, the method 550 of FIG. 5, for the task of assembling the parts that compose a gearbox. FIGS. 15A-D show the overall DHM positioning 1550*a-d* in the environments while executing the determined grasps 1551*a-d* on the bearing cover 1552*a*, housing 1552*b*, screw 1552*c*, and flange 1552*d*. The examples shown in FIGS. 15A-D provide a good representation of grasps that can be determined by embodiments with different grasp types and locations. FIGS. 15A-D also show that the overall manikin postures 1550*a-d* are plausible. This is because the degrees of freedom allowed to the upper limb end effector by the inverse kinematic solver provide the solver with sufficient room to find plausible body postures.

Embodiments work well when grasping objects that are well represented by their oriented bounding box. More complex and bigger parts may be further segmented into multiple smaller subparts (Miller 2003) and, in turn, embodiments may be implemented on more specific locations on the object, i.e., the smaller subparts.

Computer Support

Embodiments can be implemented in the Smart Posture Engine (SPE) framework inside Dassault Systèmes application "Ergonomic Workplace Design". With the Ergo4All (Bourret 2021) technology, the SPE enables assessment and minimization of ergonomic risks involved in simulated workplaces.

Figure 16:
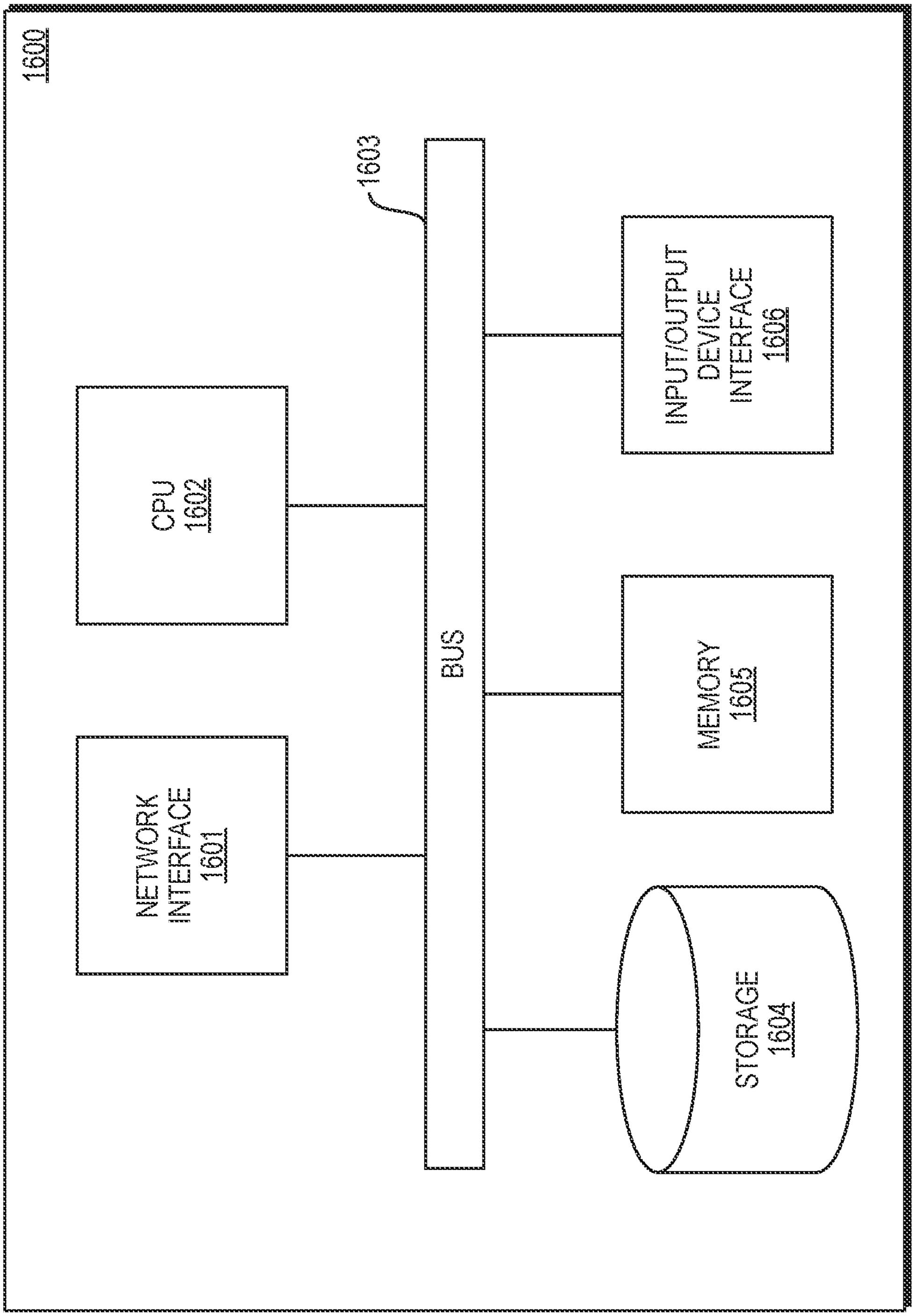
FIG. 16 is a simplified diagram of a computer system for determining position and orientation of an end effector of a DHM for grasping an object according to an embodiment.

Moreover, embodiments may be implemented in any computer architectures known to those of skill in the art. For instance, FIG. 16 is a simplified block diagram of a computer-based system 1000 that may be used to determine grasps, i.e., position and orientation of an end effector of a digital human model for grasping an object, according to any variety of the embodiments of the present invention described herein. The system 1600 comprises a bus 1603. The bus 1603 serves as an interconnect between the various components of the system 1600. Connected to the bus 1603 is an input/output device interface 1606 for connecting various input and output devices such as a keyboard, mouse, display, speakers, etc. to the system 1600. A central processing unit (CPU) 1602 is connected to the bus 1603 and provides for the execution of computer instructions. Memory 1605 provides volatile storage for data used for carrying out computer instructions. In particular, memory 1605 and storage 1604 hold computer instructions and data (databases, tables, etc.) for carrying out the methods described herein, e.g., 100, 550, 660, 1330 of FIGS. 1, 5, 6, and 13, respectively. Storage 1604 provides non-volatile storage for software instructions, such as an operating system (not shown). The system 1600 also comprises a network interface 1601 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 1600, or a computer network environment such as the computer environment 1710, described herein below in relation to FIG. 17. The computer system 1600 may be transformed into the machines that execute the methods (e.g., 100, 550, 660, and 1330) and techniques described herein, for example, by loading software instructions into either memory 1605 or non-volatile storage 1604 for execution by the CPU 1602. One of ordinary skill in the art should further understand that the system 1600 and its various components may be configured to carry out any embodiments or combination of embodiments of the present invention described herein. Further, the system 1600 may implement the various embodiments described herein utilizing any combination of hardware, software, and firmware modules operatively coupled, internally, or externally, to the system 1600.

Figure 17:
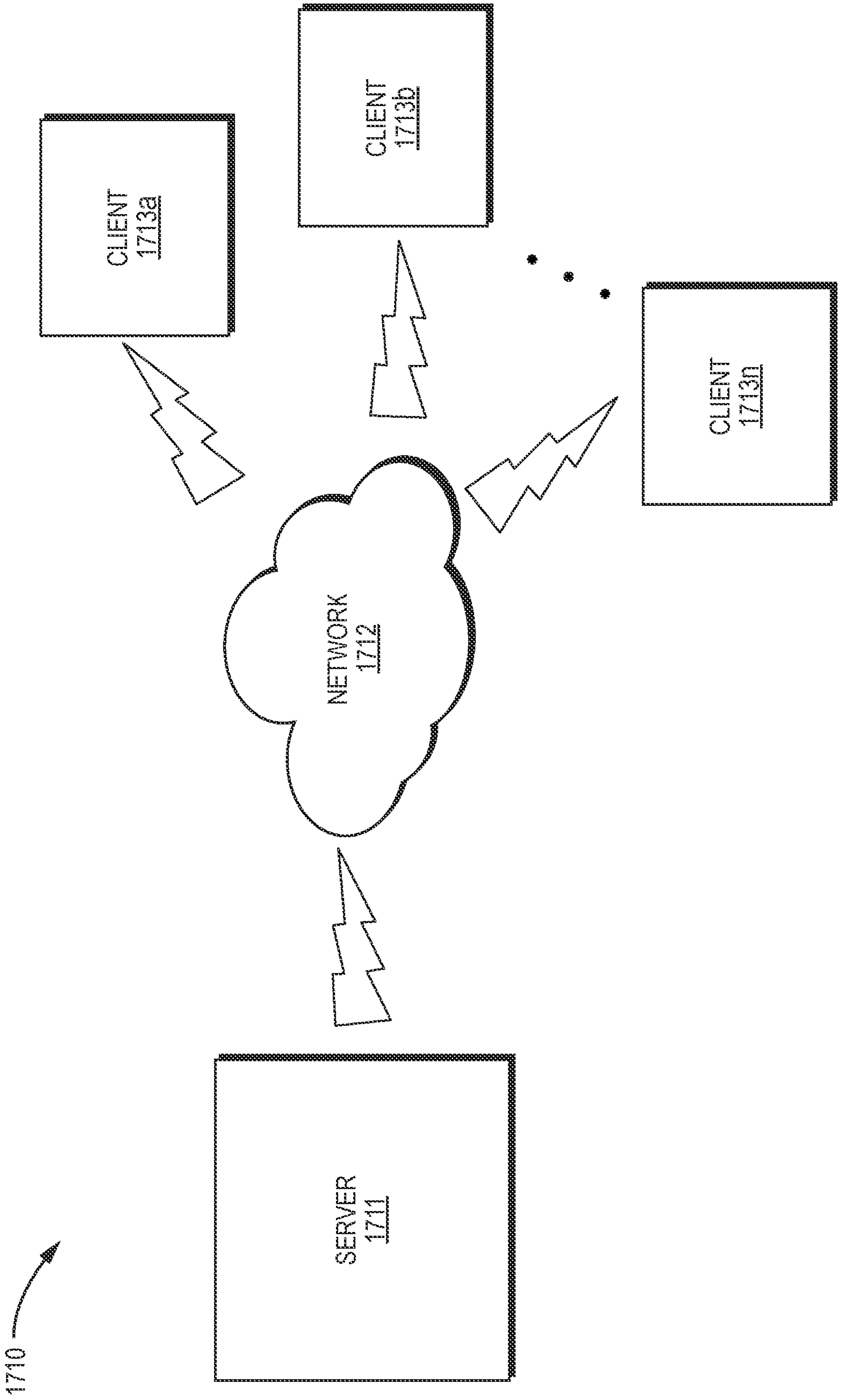
FIG. 17 is a simplified diagram of a computer network environment in which embodiments of the present invention may be implemented.

FIG. 17 illustrates a computer network environment 1710 in which an embodiment of the present invention may be implemented. In the computer network environment 1710, the server 1711 is linked through the communications network 1712 to the clients 1713*a-n*. The environment 1710 may be used to allow the clients 1713*a-n*, alone or in combination with the server 1711, to execute any of the embodiments described herein. For non-limiting example, computer network environment 1710 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

V.S.R. Group. Technical report for project virtual soldier research. Center for Computer-Aided Design, the University of IOWA. 2004

Badler, Norman I., Palmer, Martha S., Bindiganavale, Rama. Animation control for real-time virtual humans. Communications of the ACM, 1999, vol. 42, no 8, p. 64-73.

Zhou, Wei, Armstrong, Thomas J., Reed, Matthew P., et al. Simulating complex automotive assembly tasks using the HUMOSIM framework. SAE Technical Paper, 2009.

Cort J A, Devries D. Accuracy of Postures Predicted Using a Digital Human Model During Four Manual Exertion Tasks, and Implications for Ergonomic Assessments. IISE Transactions on Occupational Ergonomics and Human Factors. 7(1):43-58 (2019).

Hanson L, Hogberg D, Carlson J S, Bohlin R, Brolin E, Delfs N, et al. IMMA—Intelligently moving manikins in automotive applications. Third International Summit on Human Simulation (ISHS2014) (2014).
Lemieux, P.-O., Barré, A., Hagemeister, N., Aissaoui, R.: Degrees of freedom coupling adapted to the upper limb of a digital human model. Int. J. Hum. Factors Model. Simul. 5(4), 314-337 (2017)
Lemieux, P., Cauffiez, M., Barré, A., Hagemeister, N., Aissaoui, R.: A visual acuity constraint for digital human modeling. In: 4th Conference proceedings (2016)
Zeighami, A., Lemieux, P., Charland, J., Hagemeister, N., Aissaoui, A.: Stepping behavior for stability control of a digital human model. ISB/ASB (2019)
Bohg, J.; Morales, A.; Asfour, T.; Kragic, D.; Data-driven grasp synthesis—a survey, IEEE Transactions on Robotics, 30(2), 2013, 289-309. https://doi.org/10.1109/TRO.2013.2289018
Zhou, Wei, ARMSTRONG, Thomas J., REED, Matthew P., et al. Simulating complex automotive assembly tasks using the HUMOSIM framework. SAE Technical Paper, 2009.
Bourret, Q., Lemieux, P., Hagemeister, N., Aissaoui, R.: Flexible hand posture for tools grasping. DHM (2019)
Macloud, Alexandre, Zeighami, Ali, Aissaoui, Rachid, et al. Extracting grasping cues from pistol-shaped tools for digital human models. Computer-Aided Design and Applications, 2021, vol. 18, no 6, p. 1167-1185.
Macloud, A.; Zeighami, A.; Aissaoui, R.; Rivest, L.; Extracting grasping cues from one-handed tools geometry for digital human models, International Conference on Human Systems Integration (HSI2019), Biarritz, France, 2019.
Bekey, George A., Liu, Huan, Tomovic, Rajko, et al. Knowledge-based control of grasping in robot hands using heuristics from human motor skills. IEEE Transactions on Robotics and Automation, 1993, vol. 9, no 6, p. 709-722.
Feix, Thomas, Romero, Javier, Schmiedmayer, Heinz-Bodo, et al. The grasp taxonomy of human grasp types. IEEE Transactions on human-machine systems, 2015, vol. 46, no 1, p. 66-77.
Feix, Thomas, Bullock, Ian M., et Dollar, Aaron M. Analysis of human grasping behavior: Object characteristics and grasp type. IEEE transactions on haptics, 2014, vol. 7, no 3, p. 311-323.
Miller, A. T., Knoop, S., Christensen, H. I. and Allen, P. K., Automatic grasp planning using shape primitives. in Robotics and Automation, 2003. Proceedings. ICRA'03. IEEE International Conference on, (2003), IEEE, 1824-1829.
Bourret, Quentin, et al. "Ergo4A11: An Ergonomic Guidance Tool for Non-ergonomist." Congress of the International Ergonomics Association. Springer, Cham, 2021.

What is claimed is:

1. A computer-implemented method of automatically determining and setting, in a computer-based simulation, position and orientation of an end effector of a digital human model (DHM) for grasping an object, the method comprising:

receiving (i) a computer-based model of an object, (ii) a computer-based model of an environment, and (iii) an indication of position of a DHM in the environment;

determining an oriented bounding box surrounding the received model of the object, wherein the oriented bounding box includes a plurality of faces;

for each of the plurality of faces, determining: a candidate grasp location, a candidate grasp orientation, and a candidate grasp type;

from amongst the plurality of faces, determining one or more graspable faces based on: (a) the determined candidate grasp location of each face, (b) the determined candidate grasp orientation of each face, (c) the received model of the environment, and (d) dimensions of each face;

from amongst the determined one or more graspable faces, determining an optimal graspable face based on a predetermined grasping hierarchy and the received indication of position of the DHM in the environment; and using an inverse kinematic solver to automatically determine and set, in a computer-based simulation of the DHM, position and orientation of an end effector of the DHM grasping the object based on the determined candidate grasp location, the determined candidate grasp orientation, and the determined candidate grasp type of the determined optimal graspable face.

2. The method of claim 1 wherein determining the oriented bounding box comprises:

determining a minimum bounding box surrounding the received model of the object;

determining a principal axis of inertia of the object based on the received model of the object;

orienting the determined minimum bounding box based on the determined principal axis of inertia; and setting the oriented minimum bounding box as the oriented bounding box surrounding the received model of the object.

3. The method of claim 2 wherein determining a candidate grasp orientation for a given face of the plurality of faces comprises:

setting the candidate grasp orientation for the given face based on the determined principal axis of inertia of the object.

4. The method of claim 1 wherein determining a candidate grasp location for a given face of the plurality of faces comprises:

based on the received model of the object, calculating a geometrical center of the object;

projecting from the calculated geometrical center of the object to the given face; and setting location of an intersection of the projection and the given face as the candidate grasp location for the given face.

5. The method of claim 1 wherein determining a candidate grasp type for a given face of the plurality of faces comprises:

calculating length of a first edge and a second edge of the given face, wherein the first edge and the second edge are perpendicular to each other;

calculating length of a face edge normal to the first edge and the second edge; and determining the candidate grasp type for the given face based on: (i) the calculated length of the first edge, (ii) the calculated length of the second edge, and (iii) the calculated length of the face edge normal to the first edge and the second edge.

6. The method of claim 1 wherein each determined candidate grasp type is one of: a pinch type, a medium-wrap type, and a precision sphere type.

7. The method of claim 1 wherein, determining one or more graspable faces based on: (a) the determined candidate grasp location of each face, (b) the determined candidate grasp orientation of each face, (c) the received model of the environment, and (d) the dimensions of each face comprises:

identifying a given face as a graspable face if (i) the end effector of the DHM, at the determined candidate grasp location in the determined candidate grasp orientation, does not collide with an element in the model of the environment and (ii) dimensions of the given face do not exceed a threshold.

8. The method of claim 1 wherein the DHM includes a left end effector and a right end effector and the method further comprises:

receiving an indication of the end effector, from amongst the left end effector and the right end effector, of the DHM grasping the object.

9. The method of claim 8 further comprising:

selecting the predetermined grasping hierarchy based on the received indication of the end effector.

10. The method of claim 1 further comprising:

configuring the inverse kinematic solver to have an unconstrained rotation degree of freedom along an axis normal to the determined optimal graspable face.

11. The method of claim 1 further comprising:

applying a respective label to each face of the plurality of faces, wherein for each face the respective label is a function of position of the DHM in relation to the face.

12. The method of claim 11 wherein the predetermined grasping hierarchy indicates a preferred order of graspable faces as a function of each respective label.

13. The method of claim 1 further comprising:

performing the computer-based simulation of the DHM using the automatically determined and set position and orientation of the end effector to simulate physical interaction between the DHM and the object.

14. A system for automatically determining and setting, in a computer-based simulation, position and orientation of an end effector of a digital human model (DHM) for grasping an object, the system comprising:

a processor; and a memory with computer code instructions stored thereon, the processor and the memory, with the computer code instructions, being configured to cause the system to:

receive (i) a computer-based model of an object, (ii) a computer-based model of an environment, and (iii) an indication of position of a DHM in the environment;

determine an oriented bounding box surrounding the received model of the object, wherein the oriented bounding box includes a plurality of faces;

for each of the plurality of faces, determine: a candidate grasp location, a candidate grasp orientation, and a candidate grasp type;

from amongst the plurality of faces, determine one or more graspable faces based on: (a) the determined candidate grasp location of each face, (b) the determined candidate grasp orientation of each face, (c) the received model of the environment, and (d) dimensions of each face;

from amongst the determined one or more graspable faces, determine an optimal graspable face based on a predetermined grasping hierarchy and the received indication of position of the DHM in the environment; and use an inverse kinematic solver to automatically determine and set, in a computer-based simulation of the DHM, position and orientation of an end effector of the DHM grasping the object based on the determined candidate grasp location, the determined candidate grasp orientation, and the determined candidate grasp type of the determined optimal graspable face.

15. The system of claim 14 wherein:

in determining the oriented bounding box, the processor and the memory, with the computer code instructions, are further configured to cause the system to:

determine a minimum bounding box surrounding the received model of the object;

determine a principal axis of inertia of the object based on the received model of the object;

orient the determined minimum bounding box based on the determined principal axis of inertia; and set the oriented minimum bounding box as the oriented bounding box surrounding the received model of the object; and in determining a candidate grasp orientation for a given face of the plurality of faces, the processor and the memory, with the computer code instructions, are further configured to cause the system to:

set the candidate grasp orientation for the given face based on the determined principal axis of inertia of the object.

16. The system of claim 14 wherein, in determining a candidate grasp location for a given face of the plurality of faces, the processor and the memory, with the computer code instructions, are further configured to cause the system to:

based on the received model of the object, calculate a geometrical center of the object;

project from the calculated geometrical center of the object to the given face; and set location of an intersection of the projection and the given face as the candidate grasp location for the given face.

17. The system of claim 14 wherein, in determining a candidate grasp type for a given face of the plurality of faces, the processor and the memory, with the computer code instructions, are further configured to cause the system to:

calculate length of a first edge and a second edge of the given face, wherein the first edge and the second edge are perpendicular to each other;

calculate length of a face edge normal to the first edge and the second edge; and determine the candidate grasp type for the given face based on: (i) the calculated length of the first edge, (ii) the calculated length of the second edge, and (iii) the calculated length of the face edge normal to the first edge and the second edge.

18. The system of claim 14 wherein, in determining one or more graspable faces based on: (a) the determined candidate grasp location of each face, (b) the determined candidate grasp orientation of each face, (c) the received model of the environment, and (d) the dimensions of each face, the processor and the memory, with computer code instructions, are further configured to cause the system to:

identify a given face as a graspable face if (i) the end effector of the DHM, at the determined candidate grasp location in the determined candidate grasp orientation, does not collide with an element in the model of the environment and (ii) dimensions of the given face do not exceed a threshold.

19. The system of claim 14 wherein the processor and the memory, with the computer code instructions, are further configured to cause the system to:

configure the inverse kinematic solver to have an unconstrained rotation degree of freedom along an axis normal to the determined optimal graspable face.

20. A computer program product for automatically determining and setting, in a computer-based simulation, position and orientation of an end effector of a digital human model (DHM) for grasping an object, the computer program product executed by a server in communication across a network with one or more client and comprising:

a non-transitory computer readable medium, the computer readable medium comprising program instructions which, when executed by a processor, causes the processor to:

receive (i) a computer-based model of an object, (ii) a computer-based model of an environment, and (iii) an indication of position of a DHM in the environment;

determine an oriented bounding box surrounding the received model of the object, wherein the oriented bounding box includes a plurality of faces;

for each of the plurality of faces, determine: a candidate grasp location, a candidate grasp orientation, and a candidate grasp type;

from amongst the plurality of faces, determine one or more graspable faces based on: (a) the determined candidate grasp location of each face, (b) the determined candidate grasp orientation of each face, (c) the received model of the environment, and (d) dimensions of each face;

from amongst the determined one or more graspable faces, determine an optimal graspable face based on a predetermined grasping hierarchy and the received indication of position of the DHM in the environment; and use an inverse kinematic solver to automatically determine and set, in a computer-based simulation of the DHM, position and orientation of an end effector of the DHM grasping the object based on the determined candidate grasp location, the determined candidate grasp orientation, and the determined candidate grasp type of the determined optimal graspable face.

* * * * *